United States Patent
Maeda et al.

(10) Patent No.: US 6,418,425 B1
(45) Date of Patent: Jul. 9, 2002

(54) PREDICTION APPARATUS FOR PREDICTING BASED ON SIMILAR CASES AND METHOD THEREOF

(75) Inventors: Kazuho Maeda; Yoshinori Yaginuma, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/420,780

(22) Filed: Oct. 19, 1999

(30) Foreign Application Priority Data

Nov. 24, 1998 (JP) .......................................... 10-332503

(51) Int. Cl.$^7$ .............................................. G06F 9/445
(52) U.S. Cl. ....................................................... 706/47
(58) Field of Search ............................. 706/47, 25, 16, 706/14, 45; 707/2

(56) References Cited

U.S. PATENT DOCUMENTS

| | | | | |
|---|---|---|---|---|
| 5,450,527 A | * | 9/1995 | Wang ........................... | 706/25 |
| 5,455,890 A | * | 10/1995 | Wang ........................... | 706/16 |
| 5,701,400 A | * | 12/1997 | Amado ......................... | 706/45 |
| 5,724,486 A | * | 3/1998 | Wang ........................... | 706/47 |
| 5,787,235 A | * | 7/1998 | Smith et al. .................. | 706/47 |
| 5,950,182 A | * | 9/1999 | Godbole et al. .............. | 706/45 |
| 5,960,422 A | * | 9/1999 | Prasad ......................... | 707/2 |
| 6,006,213 A | * | 12/1999 | Yoshida ....................... | 706/14 |

OTHER PUBLICATIONS

The Center for Data Insight (CDI), A Perspective on Data Mining, Northern Arizona University (Jul./1998), Dr. Kenneth Collier, Dr. Bernard Carey, Ms. Ellen Grusy, Mr. Curt Marjaniemi, Mr. Donald Sautter.*

How to Use Expert Advice, Nicolo Cesa–Bianchi, Yoav Freund, David Haussler & David P. Helmbold, Rocert E. Schapire, Marfred K. Warmuth, (1997). Journal of the ACM, vol. 44, No. 3, May 1997, pp. 427–485.*

Data Clustering: A Review, A.L. Jain, M.N. Murity, P.J. Flynn, ACM Computing Surveys, vol. 31, No. 3, Sep. 1999.*

Competitive Solutions for Online Financial Problems, Ran El–Yaniv, ACM Computing Surveys, vol. 30, No. 1, Mar. 1998.*

C. Stanfill, et al., "Toward Memory–Based Reasoning", Communications of the ACM, Dec. 1986, vol. 29, No. 12, pp. 1213–1228.

T. Mohri, et al., "Nearest Neighbor Rule and Memory––Based Reasoning", Journal of Japanese Society for Artificial Intelligence, vol. 12, No. 2, Mar. 1997, pp. 1–4.

* cited by examiner

Primary Examiner—Thomas Black
Assistant Examiner—Michael B. Holmes
(74) Attorney, Agent, or Firm—Staas & Halsey LLP

(57) ABSTRACT

An optimum similar case extracting condition is automatically determined using a known case aggregate, and the unknown field of an unknown case aggregate is predicted from the known case aggregate using the condition. At this point, the degree of similarity depending on the distribution of the values of the unknown field in the known case aggregate is calculated and a similar case aggregate is extracted based on the degree of similarity. When it is confirmed that the degree of similarity does not satisfy a predetermined condition, the similarity calculation is stopped.

33 Claims, 34 Drawing Sheets

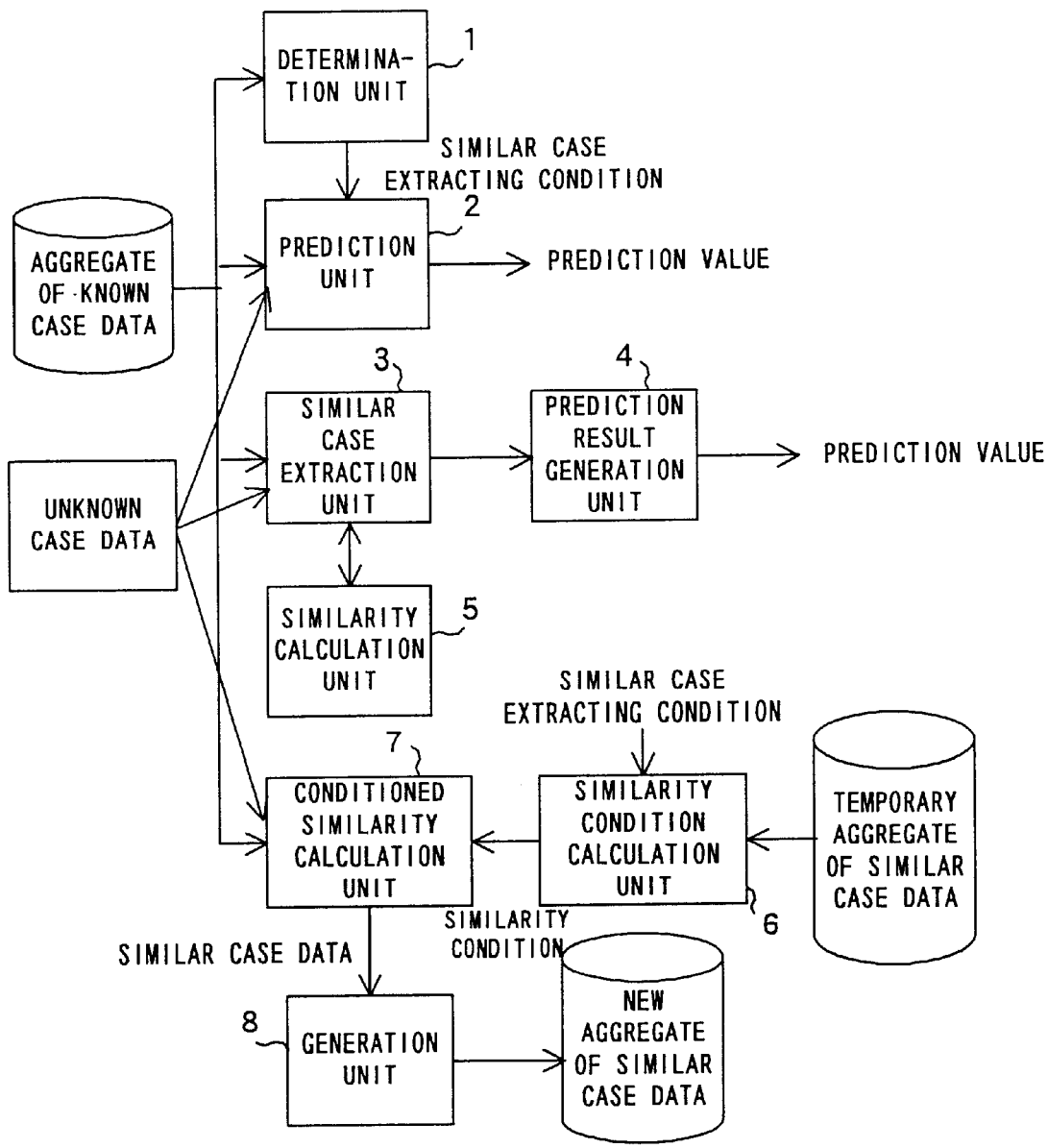
F I G. 1

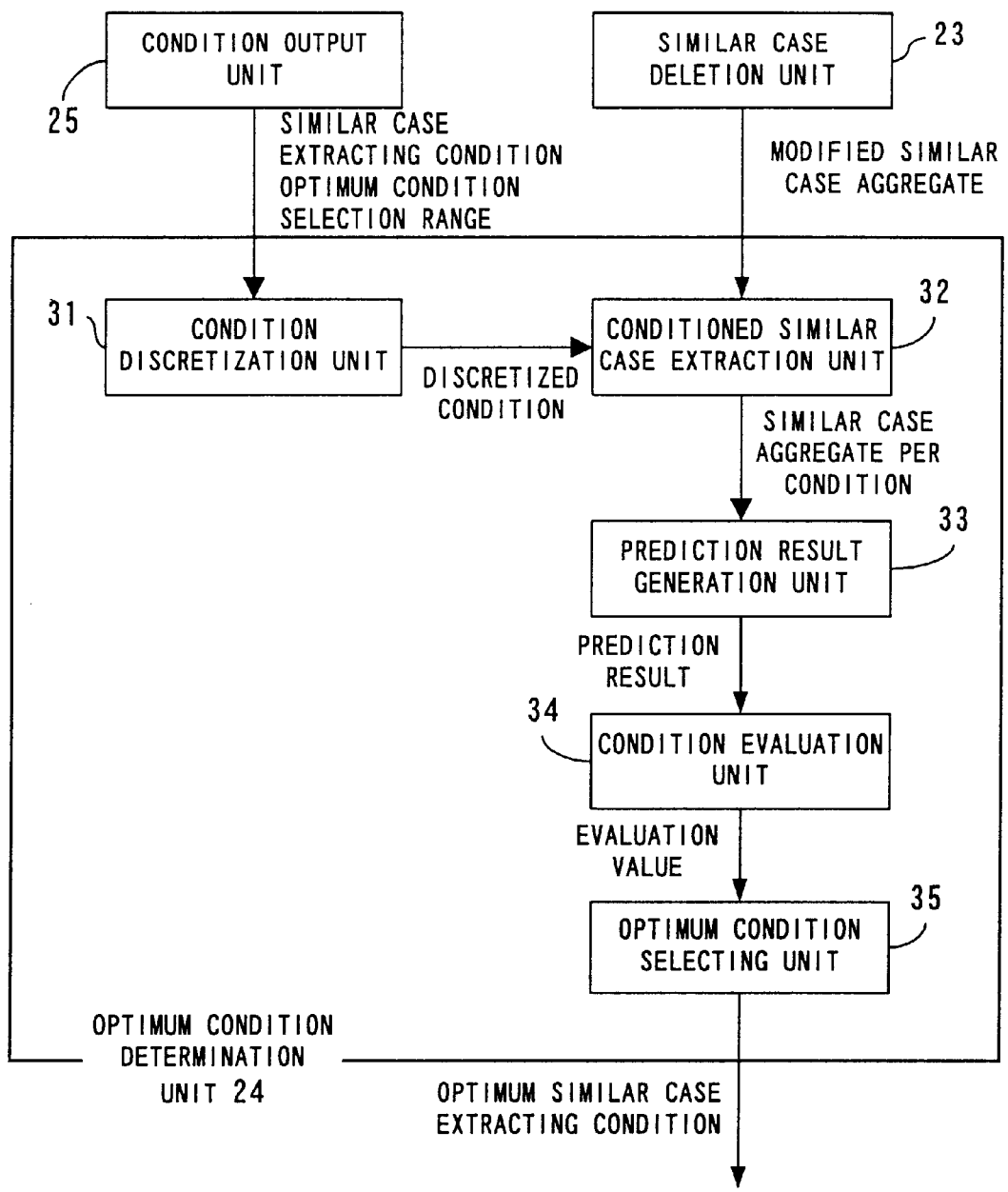
F I G. 4

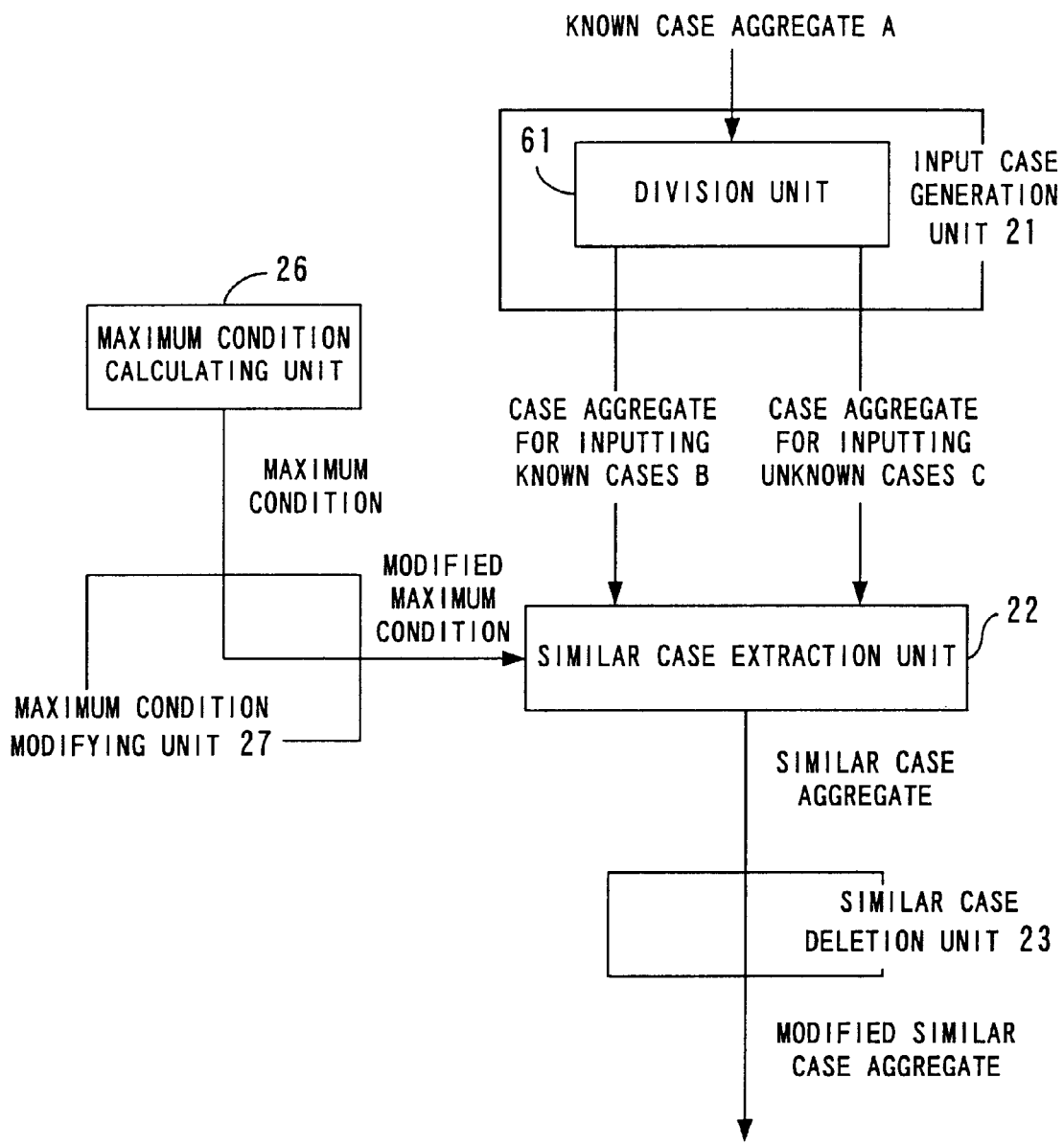
F I G. 7

| NAME | AGE | SEX | OCCUPATION | MARITAL STATUS | REPLY |
|---|---|---|---|---|---|
| A | 30 | MALE | PUBLIC OFFICIAL | MARRIED | YES |
| B | 25 | MALE | OFFICE WORKER | SINGLE | YES |
| C | 40 | FEMALE | UNEMPLOYED | MARRIED | NO |
| D | 50 | MALE | FARMER | MARRIED | NO |
| E | 22 | MALE | STUDENT | SINGLE | YES |
| F | 20 | FEMALE | STUDENT | SINGLE | NO |
| G | 34 | MALE | OFFICE WORKER | SINGLE | NO |

FIG. 12

| NAME | AGE | SEX | OCCUPATION | MARITAL STATUS | REPLY |
|---|---|---|---|---|---|
| A | 30 | MALE | PUBLIC OFFICIAL | MARRIED | YES |
| C | 40 | FEMALE | UNEMPLOYED | MARRIED | NO |
| E | 22 | MALE | STUDENT | SINGLE | YES |
| G | 34 | MALE | OFFICE WORKER | SINGLE | NO |

FIG. 13

| NAME | AGE | SEX | OCCUPATION | MARITAL STATUS | REPLY | SIMILARITY |
|------|-----|-----|------------|----------------|-------|------------|
| A | 30 | MALE | PUBLIC OFFICIAL | MARRIED | YES | *** |
| G | 34 | MALE | OFFICE WORKER | SINGLE | NO | 6 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 2 |
| D | 50 | MALE | FARMER | MARRIED | NO | 1.5 |

FIG. 14

| NAME | AGE | SEX | OCCUPATION | MARITAL STATUS | REPLY | SIMILARITY |
|------|-----|-----|------------|----------------|-------|------------|
| C | 40 | FEMALE | UNEMPLOYED | MARRIED | NO | *** |
| G | 34 | MALE | OFFICE WORKER | SINGLE | NO | 5 |
| A | 30 | MALE | PUBLIC OFFICIAL | MARRIED | YES | 3 |
| D | 50 | MALE | FARMER | MARRIED | NO | 2.5 |
| F | 20 | FEMALE | STUDENT | SINGLE | NO | 2 |
| B | 25 | MALE | OFFICE WORKER | SINGLE | YES | 1 |

| NAME | AGE | SEX | OCCUPATION | MARITAL STATUS | REPLY | SIMILARITY |
|---|---|---|---|---|---|---|
| E | 22 | MALE | STUDENT | SINGLE | YES | *** |
| B | 25 | MALE | OFFICE WORKER | SINGLE | YES | 6 |
| A | 30 | MALE | PUBLIC OFFICIAL | MARRIED | YES | 3 |
| F | 20 | FEMALE | STUDENT | SINGLE | NO | 2.5 |
| G | 34 | MALE | OFFICE WORKER | SINGLE | NO | 1.5 |
| C | 40 | FEMALE | UNEMPLOYED | MARRIED | NO | 1 |

FIG. 17

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | *** |
| A | 30 | MALE | PUBLIC OFFICIAL | MARRIED | YES | 5 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 1.5 |
| D | 50 | MALE | FARMER | MARRIED | NO | 1 |

FIG. 18

| NAME | AGE | SEX | OCCUPATION | MARITAL STATUS | REPLY | SIMILARITY |
|------|-----|-----|------------|----------------|-------|------------|
| G | 34 | MALE | OFFICE WORKER | SINGLE | NO | 6 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 2 |
| D | 50 | MALE | FARMER | MARRIED | NO | 1.5 |

FIG. 19

| NAME | AGE | SEX | OCCUPATION | MARITAL STATUS | REPLY | SIMILARITY |
|------|-----|-----|------------|----------------|-------|------------|
| G | 34 | MALE | OFFICE WORKER | SINGLE | NO | 5 |
| A | 30 | MALE | PUBLIC OFFICIAL | MARRIED | YES | 3 |
| D | 50 | MALE | FARMER | MARRIED | NO | 2.5 |
| F | 20 | FEMALE | STUDENT | SINGLE | NO | 2 |
| B | 25 | MALE | OFFICE WORKER | SINGLE | YES | 1 |

FIG. 20

| NAME | AGE | SEX | OCCUPATION | MARITAL STATUS | REPLY | SIMILARITY |
|------|-----|-----|------------|----------------|-------|------------|
| B | 25 | MALE | OFFICE WORKER | SINGLE | YES | 6 |
| A | 30 | MALE | PUBLIC OFFICIAL | MARRIED | YES | 3 |
| F | 20 | FEMALE | STUDENT | SINGLE | NO | 2.5 |
| G | 34 | MALE | OFFICE WORKER | SINGLE | NO | 1.5 |
| C | 40 | FEMALE | UNEMPLOYED | MARRIED | NO | 1 |

| NAME | AGE | SEX | OCCUPATION | MARITAL STATUS | REPLY | SIMILARITY |
|---|---|---|---|---|---|---|
| A | 30 | MALE | PUBLIC OFFICIAL | MARRIED | YES | 5 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 1.5 |
| D | 50 | MALE | FARMER | MARRIED | NO | 1 |

FIG. 21

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 6 |

FIG. 22

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 5 |

| NAME | AGE | SEX | OCCUPATION | MARITAL STATUS | REPLY | SIMILARITY |
|------|-----|-----|------------|----------------|-------|------------|
| B | 25 | MALE | OFFICE WORKER | SINGLE | YES | 6 |

FIG. 25

| NAME | AGE | SEX | OCCUPATION | MARITAL STATUS | REPLY | SIMILARITY |
|------|-----|-----|------------|----------------|-------|------------|
| A | 30 | MALE | PUBLIC OFFICIAL | MARRIED | YES | 5 |

FIG. 26

| NAME | AGE | SEX | OCCUPATION | MARITAL STATUS | REPLY | SIMILARITY |
|------|-----|-----|------------|----------------|-------|------------|
| G | 34 | MALE | OFFICE WORKER | SINGLE | NO | 6 |
| B | 25 | MALE | OFFICE WORKER | SINGLE | YES | 4 |

FIG. 27

| NAME | AGE | SEX | OCCUPATION | MARITAL STATUS | REPLY | SIMILARITY |
|------|-----|-----|------------|----------------|-------|------------|
| G | 34 | MALE | OFFICE WORKER | SINGLE | NO | 5 |
| A | 30 | MALE | PUBLIC OFFICIAL | MARRIED | YES | 3 |

FIG. 28

| NAME | AGE | SEX | OCCUPATION | MARITAL STATUS | REPLY | SIMILARITY |
|---|---|---|---|---|---|---|
| B | 25 | MALE | OFFICE WORKER | SINGLE | YES | 6 |
| A | 30 | MALE | PUBLIC OFFICIAL | MARRIED | YES | 3 |

FIG. 29

| NAME | AGE | SEX | OCCUPATION | MARITAL STATUS | REPLY | SIMILARITY |
|---|---|---|---|---|---|---|
| A | 30 | MALE | PUBLIC OFFICIAL | MARRIED | YES | 5 |
| B | 25 | MALE | OFFICE WORKER | SINGLE | YES | 4 |

FIG. 30

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 6 |
| B | 25 | MALE | OFFICE WORKER | SINGLE | YES | 4 |
| E | 22 | MALE | STUDENT | SINGLE | YES | 3 |

FIG. 31

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 5 |
| A | 30 | MALE | PUBLIC OFFICIAL | MARRIED | YES | 3 |
| D | 50 | MALE | FARMER | MARRIED | NO | 2.5 |

FIG. 32

| NAME | AGE | SEX | OCCUPATION | MARITAL STATUS | REPLY | SIMILARITY |
|---|---|---|---|---|---|---|
| B | 25 | MALE | OFFICE WORKER | SINGLE | YES | 6 |
| A | 30 | MALE | PUBLIC OFFICIAL | MARRIED | YES | 3 |
| F | 20 | FEMALE | STUDENT | SINGLE | NO | 2.5 |

FIG. 33

| NAME | AGE | SEX | OCCUPATION | MARITAL STATUS | REPLY | SIMILARITY |
|---|---|---|---|---|---|---|
| A | 30 | MALE | PUBLIC OFFICIAL | MARRIED | YES | 5 |
| B | 25 | MALE | OFFICE WORKER | SINGLE | YES | 4 |
| E | 22 | MALE | STUDENT | SINGLE | YES | 3 |

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 6 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 2 |

FIG. 34

| NAME | AGE | SEX | OCCUPATION | MARITAL STATUS | REPLY | SIMILARITY |
|---|---|---|---|---|---|---|
| G | 34 | MALE | OFFICE WORKER | SINGLE | NO | 5 |
| A | 30 | MALE | PUBLIC OFFICIAL | MARRIED | YES | 3 |
| D | 50 | MALE | FARMER | MARRIED | NO | 2.5 |
| F | 20 | FEMALE | STUDENT | SINGLE | NO | 2 |

FIG. 35

| NAME | AGE | SEX | OCCUPATION | MARITAL STATUS | REPLY | SIMILARITY |
|---|---|---|---|---|---|---|
| B | 25 | MALE | OFFICE WORKER | SINGLE | YES | 6 |
| A | 30 | MALE | PUBLIC OFFICIAL | MARRIED | YES | 3 |
| F | 20 | FEMALE | STUDENT | SINGLE | NO | 2.5 |
| G | 34 | MALE | OFFICE WORKER | SINGLE | NO | 1.5 |

FIG. 36

| NAME | AGE | SEX | OCCUPATION | MARITAL STATUS | REPLY | SIMILARITY |
|---|---|---|---|---|---|---|
| A | 30 | MALE | PUBLIC OFFICIAL | MARRIED | YES | 5 |
| B | 25 | MALE | OFFICE WORKER | SINGLE | YES | 4 |
| E | 22 | MALE | STUDENT | SINGLE | YES | 3 |
| C | 40 | FEMALE | UNEMPLOYED | MARRIED | NO | 1.5 |

F I G. 37

| NUMBER OF SIMILAR CASES | 1 | 2 | 3 | 4 | 5 |
|---|---|---|---|---|---|
| A | NO | NO | YES | NO | NO |
| C | NO | NO | NO | NO | NO |
| E | YES | YES | YES | YES | YES |
| G | YES | YES | YES | YES | YES |

F I G. 38

| NUMBER OF SIMILAR CASES | 1 | 2 | 3 | 4 | 5 |
|---|---|---|---|---|---|
| EVALUATION VALUE | 2 | 2 | 3 | 2 | 2 |

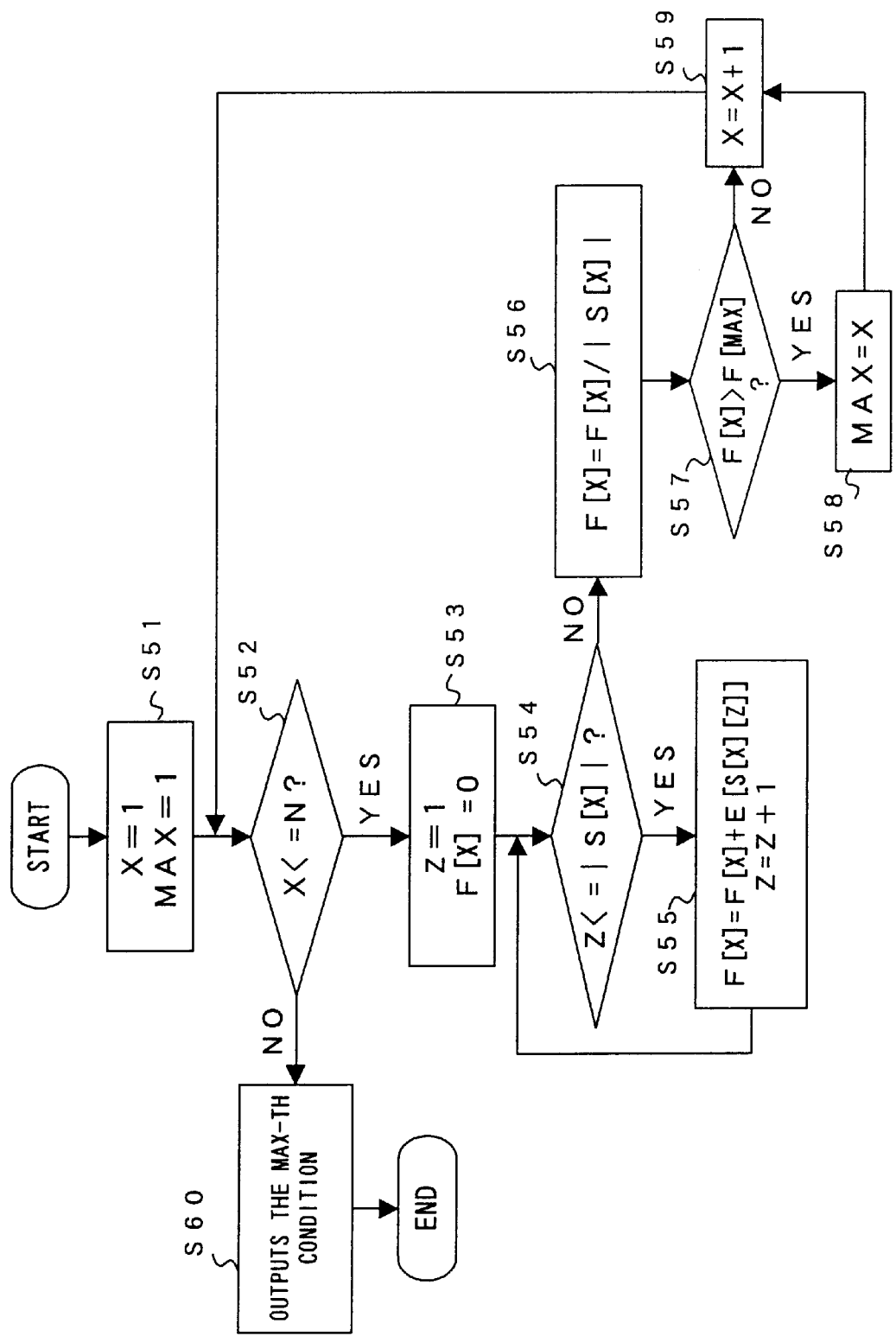
F I G. 48

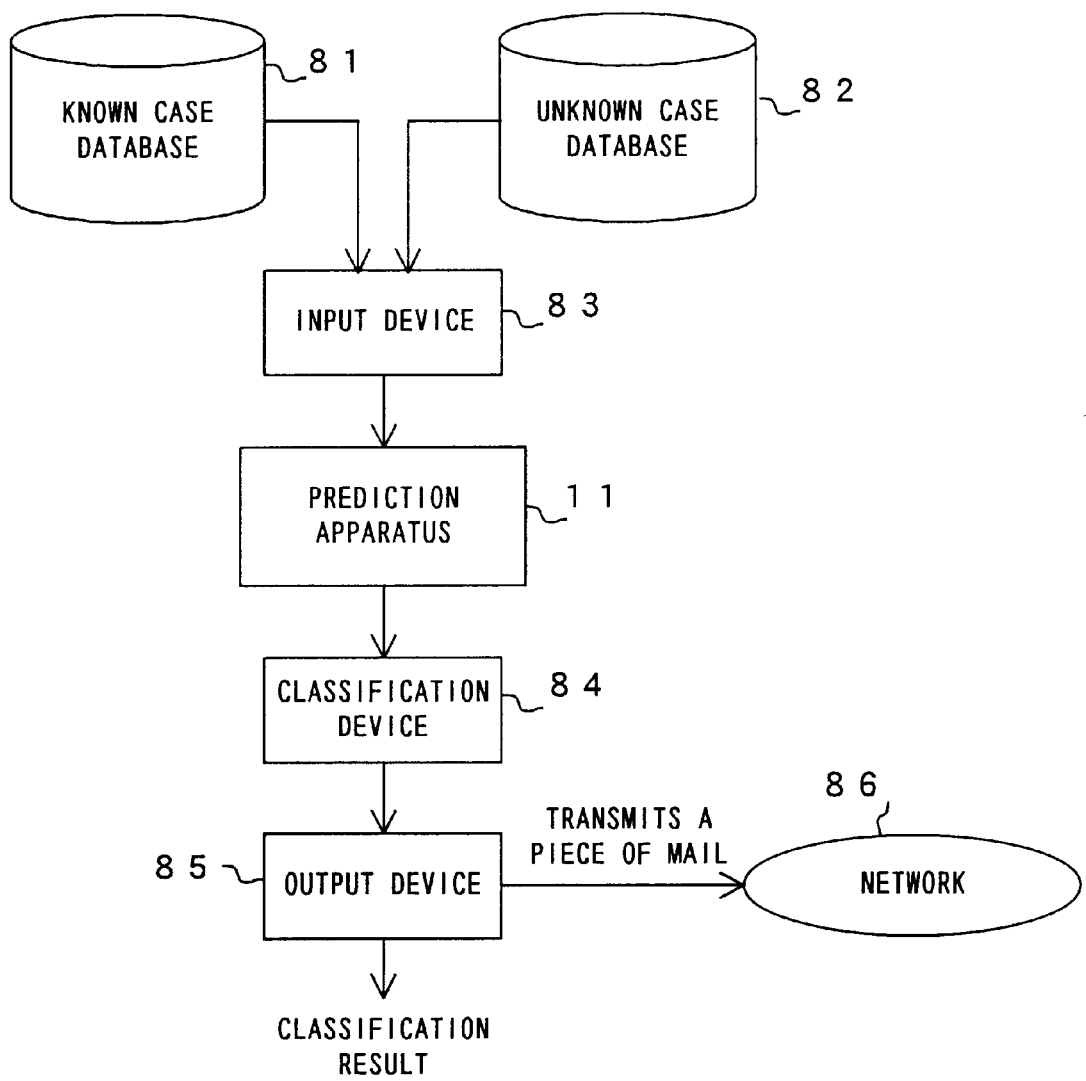
F I G. 5 0

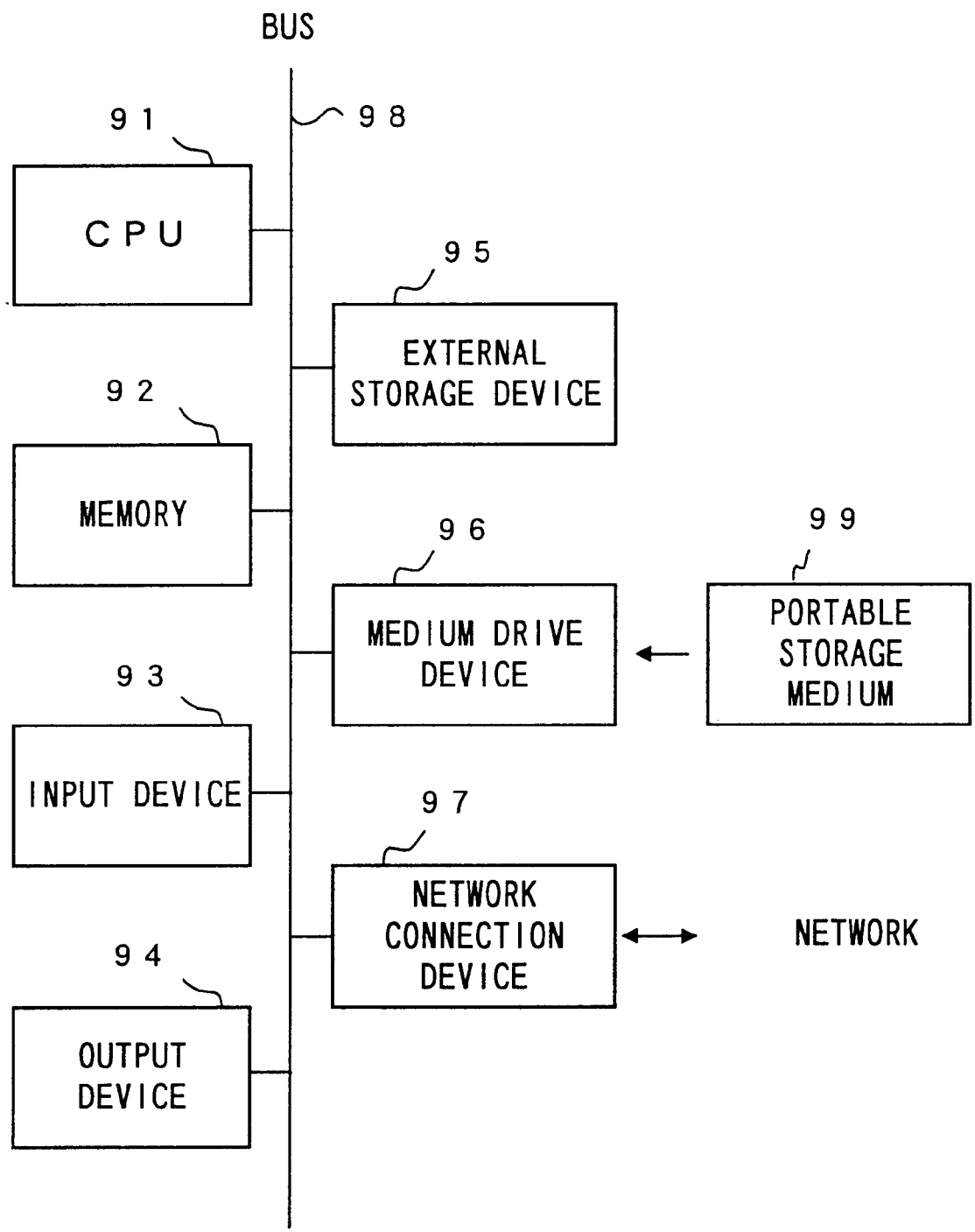
F I G. 51

PREDICTION APPARATUS FOR PREDICTING BASED ON SIMILAR CASES AND METHOD THEREOF

BACKGROUND OF THE INVENTION

1. Field of the Invention

The present invention relates to a prediction apparatus for extracting similar cases similar to a given unknown case and making a prediction for the unknown case using the extracted similar cases in fields such as artificial intelligence, statistical analysis, etc. and the method thereof.

2. Description of the Related Art

A data classifying method for determining the class (category) to which a given case (or instance) belongs is widely researched in fields such as artificial intelligence, statistical analysis, etc. A case corresponds to, for example, a data structure, such as a record, etc., and is composed of one or more fields. In each field, attribute data are recorded.

For example, when the destination of a direct mailing is determined in a sales campaign, the personal information of receivers can be handled as cases, and a great number of people can be classified using the values specified in a field. In this case, each case is provided with fields of attribute data, such as sex, age, address, occupation, etc.

For a method for predicting the class field of an aggregate (a set) of unknown cases from an aggregate of known cases, prediction based on similar cases, such as memory-based reasoning, case-based reasoning, etc., is used. A class field is a field to be predicted; a known case is a case for which the value of the class field is known; and an unknown case is a case for which the value of the class field is unknown.

In the above-described example of a direct mailing, for example, a flag indicating whether a receiver replied to the direct mailing is set as a class field. Then, the value of the class field (class value) of the unknown case aggregate is predicted using an aggregate of people to whom the direct mail has already been forwarded and an aggregate of people to whom the direct mail has not yet been forwarded as a known case aggregate and an unknown case aggregate, respectively. In this way, people who have a high likelihood of replying can be selected as mailing destinations.

In order to predict the class field of an unknown case, first, the degree of similarity between cases is defined, and several cases similar to the unknown case are extracted from the known case aggregate. Then, the class field of the unknown case is predicted based on those similar cases. This prediction method differs from other prediction methods based on learning or modeling using a neural network, decision tree, etc., and has advantages in that the prediction method takes no time to learn or model and can flexibly respond to an increase of known cases.

However, the conventional prediction method described above has the following problems.

In order to make a prediction for an unknown case, similar cases must be extracted by calculating the degree of similarity between the unknown case and each of the known cases. In fact, most of the process time needed to make predictions based on similar cases is taken by the time needed for this similarity calculation. According to the conventional prediction method, in order to reduce the time required for similarity calculation, a predetermined pre-treatment must be executed for known cases (Takao Mohri, "Nearest Neighbor Rule and Memory-Based Reasoning, "Journal of Japanese Society for Artificial Intelligence, Vol.12 No.2, pp.188–195, March 1997).

In this pre-treatment, a process for dividing a known case aggregate into groups and removing a group which is judged to have a low degree of similarity to an unknown case from the target of similarity calculation, a process for deleting unnecessary cases from a known case aggregate, etc., are executed. However, if such a pre-treatment is performed, it becomes difficult to flexibly respond to the increase of known cases.

Conventionally, a default condition, such as 20 higher-order cases in the degree of similarity, or a condition manually inputted directly by a user was used as a condition for extracting similar cases. However, selection of the condition which is optimum greatly differs depending on the nature of a case aggregate and the object of problem setting, and if an appropriate condition is not designated, a satisfactory result often cannot be obtained. Under these circumstances, in order to select a condition satisfying the objective, a user often had to repeat the extraction of similar cases two or more times while changing the conditions and select an optimum condition by evaluating the results.

According to the conventional prediction method, when similar cases are selected, the accuracy is improved by setting a weight for each field based on the degree it influences a class value. One automatic weight setting method is the Cross Category Feature (CCF) method using statistical information. However, according to the CCF method, a weight is set regardless of the distribution of the class values of a known case aggregate, and the influence on weight of the change in the distribution of the class values is not sufficient. For this reason, if the distribution of the class values of a known case aggregate is largely biased, sufficient accuracy often cannot be obtained.

According to the conventional prediction method, since a speedy prediction cannot be realized without a pre-treatment for an known case aggregate, the flexibility against the increase of known cases is lost, which is a problem. Since the extraction of similar cases are repeated two or more times in order to obtain sufficient prediction accuracy, the required work of the user is large and the calculation time increases as the number of executions increases, which is another problem. Furthermore, if the distribution of the class values of a known case aggregate is largely biased, sufficient accuracy often cannot be obtained by the CCF method depending on the nature of a problem, which is another problem.

SUMMARY OF THE INVENTION

An object of the present invention is to provide a prediction apparatus for making a prediction for an unknown case based on similar cases, at high speed and with a high accuracy, and the method thereof.

In the first aspect of the present invention, a prediction apparatus comprises a determination unit and a prediction unit, and makes a prediction based on similar cases.

The determination unit automatically determines a similar case extracting condition for extracting one or more pieces of similar case data similar to unknown case data from an aggregate of known case data consisting of one or more fields. The prediction unit extracts the one or more pieces of similar case data using the similar case extracting condition determined by the determination unit, predicts the value of the unknown field of the unknown case data using the similar case data and outputs a prediction value.

In the second aspect of the present invention, a prediction apparatus comprises a similar case extraction unit, a prediction result generation unit and a similarity calculation unit, and makes a prediction based on similar cases.

The similar case extraction unit extracts one or more pieces of similar case data similar to unknown case data based on the degree of similarity from an aggregate of known case data consisting of one or more fields. The prediction result generation unit predicts the value of the unknown field of the unknown case data using the one or more pieces of similar case data, and outputs a prediction value. The similarity calculation unit calculates both the distribution of the values of the unknown field in the aggregate of known case data and a weight depending on the value of the unknown field of the unknown case data for each field, and calculates the degree of similarity using the weight for each field.

In the third aspect of the present invention, a prediction apparatus comprises a similarity condition calculation unit, a conditioned similarity calculation unit and a generation unit, and makes a prediction based on similar cases.

The similarity condition calculation unit calculates a similarity condition for adding known case data to a temporary aggregate of previously obtained similar case data using both the similar case extracting condition and the temporary aggregate of similar case data. The conditioned similarity calculation unit calculates the degree of similarity between the known case data and the unknown case data. If the degree of similarity satisfies the similarity condition, the conditioned similarity calculation unit outputs the known case data as similar case data, and when it is confirmed that the degree of similarity does not satisfy the similarity condition, the calculation is stopped. The generation unit generates a new aggregate of similar case data using the similar case data outputted from the conditioned similarity calculation unit.

BRIEF DESCRIPTION OF THE DRAWINGS

FIG. 1 shows the principle of the prediction apparatus of the present invention.

FIG. 4 shows the configuration of an optimum condition determination unit.

FIG. 7 shows the configuration of a first input case generation unit.

FIG. 12 shows an example of a known case aggregate.

FIG. 13 shows an example of a case aggregate for unknown case input.

FIG. 14 shows an example of a first similar case aggregate.

FIG. 15 shows an example of a second similar case aggregate.

FIG. 16 shows an example of a third similar case aggregate.

FIG. 17 shows an example of a fourth similar case aggregate.

FIG. 18 shows an example of a fifth similar case aggregate.

FIG. 19 shows an example of a sixth similar case aggregate.

FIG. 20 shows an example of a seventh similar case aggregate.

FIG. 21 shows an example of an eighth similar case aggregate.

FIG. 22 shows an example of a ninth similar case aggregate.

FIG. 23 shows an example of a tenth similar case aggregate.

FIG. 24 shows an example of an eleventh similar case aggregate.

FIG. 25 shows an example of a twelfth similar case aggregate.

FIG. 26 shows an example of a thirteenth similar case aggregate.

FIG. 27 shows an example of a fourteenth similar case aggregate.

FIG. 28 shows an example of a fifteenth similar case aggregate.

FIG. 29 shows an example of a sixteenth similar case aggregate.

FIG. 30 shows an example of a seventeenth similar case aggregate.

FIG. 31 shows an example of an eighteenth similar case aggregate.

FIG. 32 shows an example of a nineteenth similar case aggregate.

FIG. 33 shows an example of a twentieth similar case aggregate.

FIG. 34 shows an example of a twenty-first similar case aggregate.

FIG. 35 shows an example of a twenty-second similar case aggregate.

FIG. 36 shows an example of a twenty-third similar case aggregate.

FIG. 37 shows an example of a twenty-fourth similar case aggregate.

FIG. 38 shows an example of a prediction result.

FIG. 48 is a flowchart showing the process of an optimum condition selection unit.

FIG. 50 shows the configuration of a data classification apparatus.

FIG. 51 shows the configuration of an information processing unit.

DESCRIPTION OF THE PREFERRED EMBODIMENTS

Figure 2:
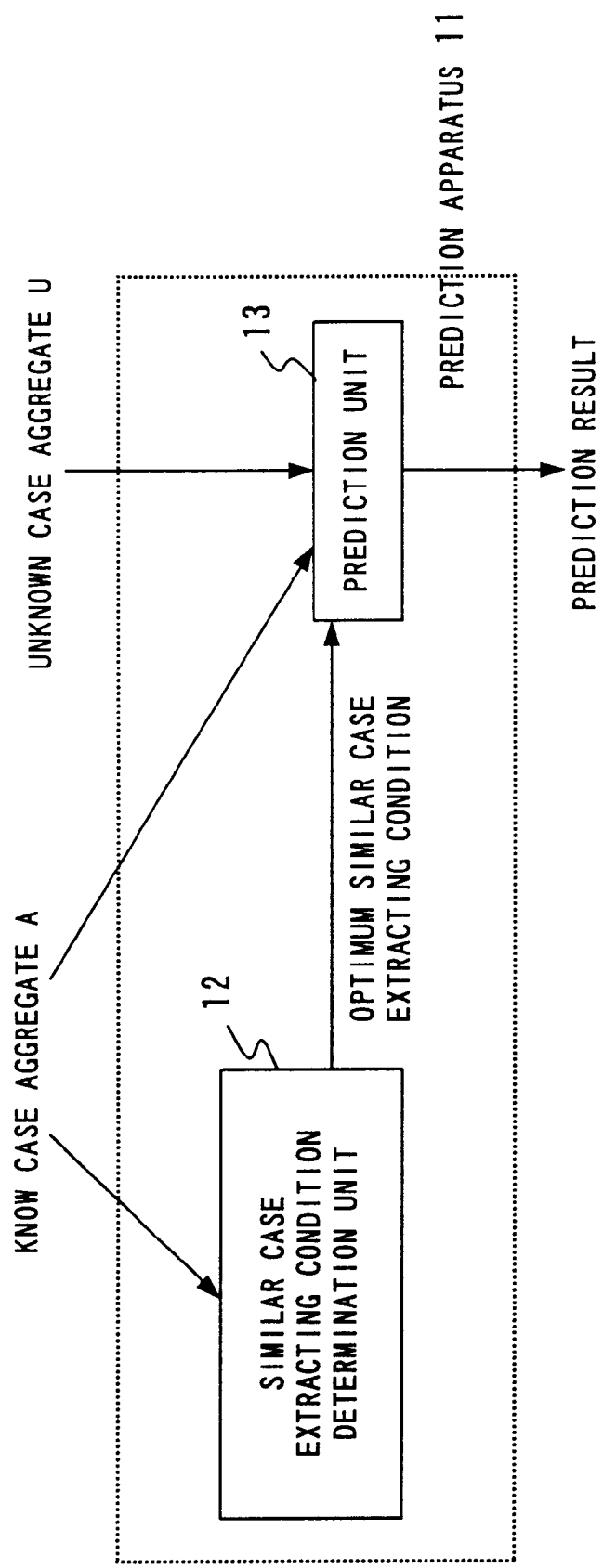
FIG. 2 shows the configuration of a prediction apparatus.

The preferred embodiments of the present invention are described in detail below with reference to the drawings.

FIG. 1 shows the principle of the prediction apparatus of the present invention.

A prediction apparatus based on the first principle of the present invention comprises a determination unit 1 and a prediction unit 2, and makes predictions based on similar cases.

The determination unit 1 automatically determines a similar case extracting condition for extracting one or more pieces of similar case data similar to unknown case data from an aggregate of known case data consisting of one or more fields.

The prediction unit 2 extracts the one or more pieces of similar case data using the similar case extracting condition determined by the determination unit 1, predicts the value of the unknown field of the unknown case data using the similar case data, and outputs a prediction value.

The determination unit 1 generates an aggregate of pseudo unknown case data (case data for inputting unknown cases) from an aggregate of known case data, and makes predictions assuming the class field of each piece of case data for inputting unknown cases to be unknown. Then, the determination unit 1 determines, for example, a similar case extracting condition from which the best result can be expected as an optimum similar case extracting condition.

The prediction unit 2 predicts the unknown field of unknown case data (class field) using the determined similar case extracting condition, and obtains a prediction value with accuracy corresponding to the similar case extracting condition.

In this way, since an optimum similar case extracting condition is automatically determined by executing a pseudo prediction process in advance using only an aggregate of known case data, it is sufficient if the real prediction of unknown case data is performed only once. Therefore, without repeating the prediction of unknown case data as in the case of the conventional process, a prediction value with high accuracy can be obtained and the process speed can be improved.

A prediction apparatus based on the second principle of the present invention comprises a similar case extraction unit 3, a prediction result generation unit 4 and a similarity calculation unit 5, and makes predictions based on similar cases.

The similar case extraction unit 3 extracts one or more pieces of similar case data similar to unknown case data based on the degree of similarity from an aggregate of known case data consisting of one or more fields.

The prediction result generation unit 3 predicts the value of the unknown field of the unknown case data using the one or more pieces of similar case data, and outputs a prediction value.

The similarity calculation unit 5 calculates both the distribution of the values of the unknown field in the aggregate of known case data and weight depending on the value of the unknown field of the unknown case data for each field, and calculates the degree of similarity using the weight for each field.

Since the weight for each field calculated by the similarity calculation unit 5 is affected by the distribution of the class values of the aggregate of known case data, the degree of similarity calculated using the weight is also affected by the distribution of the class values. The similar case extraction unit 3 extracts similar case data based on such a degree of similarity, and the prediction result generation unit 4 predicts the class value of the unknown case data using the similar case data.

In this case, if the distribution of the class values of the aggregate of known case data is heavily biased, sufficient accuracy cannot be obtained by using the conventional CCF method. However, according to the present invention, in this way, prediction with high accuracy can be realized even in such a case.

A prediction apparatus based on the third principle of the present invention comprises a similarity condition calculation unit 6, a conditioned similarity calculation unit 7 and a generation unit 8, and makes predictions based on similar cases.

The similarity condition calculation unit 6 calculates a similarity condition for adding known case data to an already obtained temporary aggregate of similar case data using both a similar case extracting condition and the temporary aggregate of similar case data.

The conditioned similarity calculation unit 7 calculates the degree of similarity between the known case data and the unknown case data. If the degree of similarity satisfies the similarity condition, the conditioned similarity calculation unit outputs the known case data as similar case data, and when it is confirmed that the degree of similarity does not satisfy the similarity condition, the calculation is stopped.

The generation unit 8 generates a new aggregate of similar case data using the similar case data outputted from the conditioned similarity calculation unit 7.

When it is confirmed during similarity calculation that the similarity condition outputted by the similarity condition calculation unit 6 is not satisfied, the conditioned similarity calculation unit 7 judges that the known case data cannot become similar case data, and stops the calculation. Then, the generation unit 8 generates an aggregate of similar case data using known case data of which the calculation is not stopped, and the prediction apparatus makes a prediction using the aggregate of similar case data.

In this way, by stopping similarity calculation for which a long time is required when similar case data are extracted, unnecessary calculation time can be cut and similar cases can be extracted at high speed. Therefore, high-speed prediction can be realized without the pre-treatment of an aggregate of known case data.

For example, the determination unit 1 and prediction unit 2 shown in FIG. 1 correspond to a similar case extracting condition determination unit 12 and prediction unit 13, respectively, shown in FIG. 2 explained later, the similar case extraction unit 3 and similarity calculation unit 5 shown in FIG. 1 correspond to a similar case extraction unit 41 shown in FIG. 5 explained later, and the prediction result generation unit 4 shown in FIG. 1 corresponds to a prediction result generation unit 42 shown in FIG. 5. For example, the similarity condition calculation unit 6 and conditioned similarity calculation unit 7 shown in FIG. 1 correspond to a similarity condition calculation unit 54 and conditioned similarity calculation unit 51, respectively, shown in FIG. 6 explained later, and the generation unit 8 corresponds to a similar case aggregate update unit 52 and similar case aggregate storage unit 53 shown in FIG. 6.

According to the present invention, when it is confirmed that a certain known case cannot become a similar case, the similarity calculation between cases is stopped. In this way, similar cases can be extracted at high speed, and high-speed prediction can be realized without the pre-treatment of a known case aggregate.

According to the present invention, an optimum similar case extracting condition which is conventionally obtained by a user explicitly repeating a process two or more times, can be automatically obtained by executing the process only once. Here, a known case aggregate or a part of the known case aggregate is used as a pseudo unknown case aggregate for testing, and prediction is performed assuming the class field of each unknown case is unknown. Then, a similar case extracting condition from which the best result is expected is determined as an optimum similar case extracting condition.

At this time, in order to avoid repeating the extraction of similar cases two or more times while changing the conditions, the broadest condition including all similar case extracting conditions is calculated in advance, and similar cases are extracted only once using the condition. Then, an optimum similar case extracting condition is determined by evaluating the obtained similar cases. In this way, a high-speed process can be realized without degrading prediction accuracy.

In the present invention, an influence calculation method which is affected by the distribution of the class values of a known case aggregate and in which the influence on the weight of the change in the distribution of the class values becomes larger than the influence in the conventional CCF method, is used. In this case, if the distribution of the class values of an aggregate of known case data is heavily biased, sufficient accuracy cannot be obtained using the conventional CCF method. However, according to the present invention, in this way, prediction with high accuracy can be realized even in such a case.

FIG. 2 shows the configuration of a prediction apparatus of the present invention. A prediction apparatus 11, shown in FIG. 2, for example, is configured using a computer, and comprises a similar case extracting condition determination unit 12 and a prediction unit 13. The functions of the similar case extracting condition determination unit 12 and the prediction unit 13, for example, are realized by running a program stored in the memory of the computer.

The similar case extracting condition determination unit 12 determines an optimum similar case extracting condition using a known case aggregate A, and outputs the condition. The prediction unit 13 predicts the class field of an unknown case aggregate U from the known case aggregate A using the output of the similar case extracting condition determination unit 12 as a similar case extracting condition, and outputs the prediction result.

Figure 3:
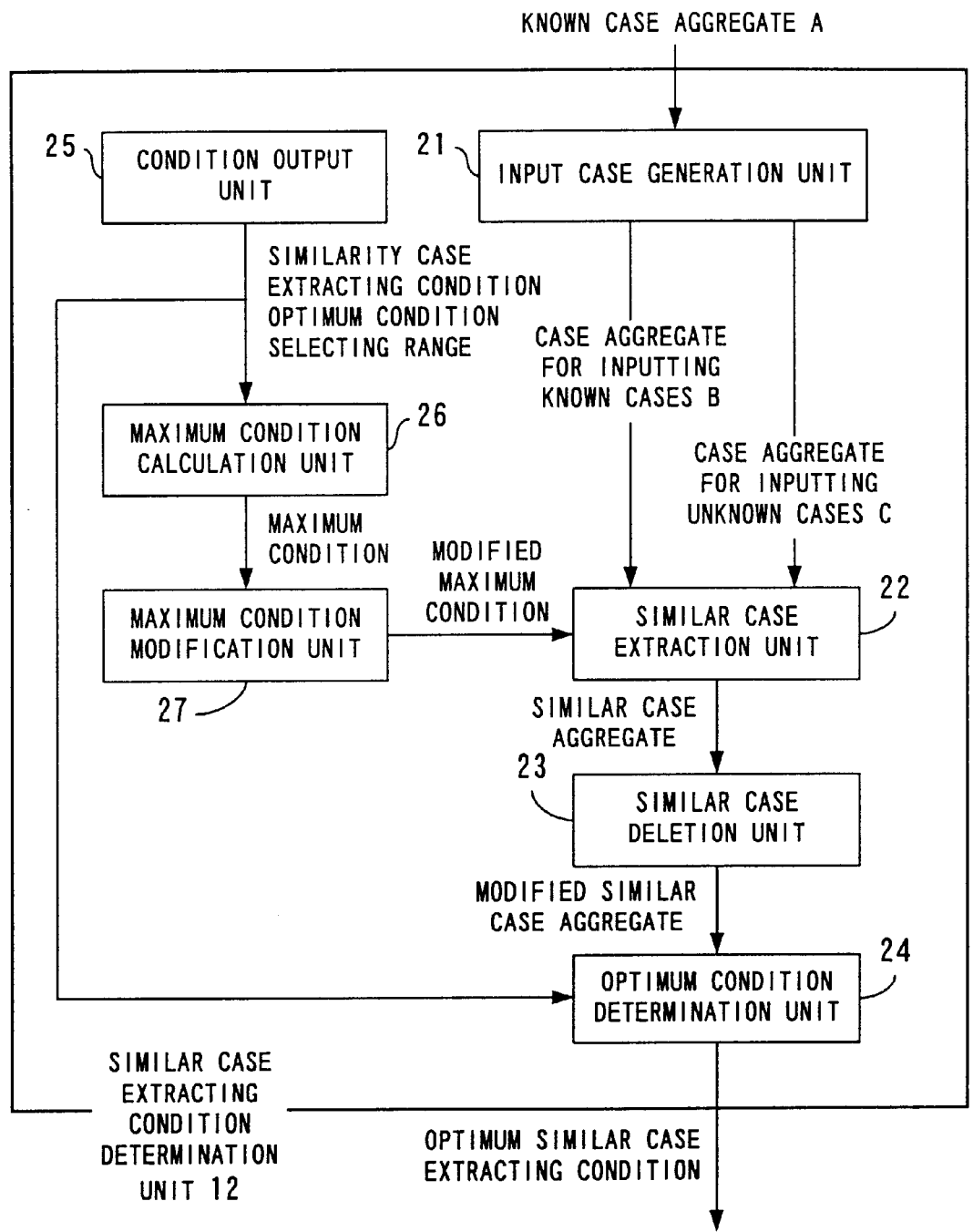
FIG. 3 shows the configuration of a similar case extracting condition determination unit.

FIG. 3 shows the configuration of the similar case extracting condition determination unit 12 shown in FIG. 2. A similar case extracting condition determination unit 12 shown in FIG. 3 comprises an input case generation unit 21, a similar case extraction unit 22, a similar case deletion unit 23, an optimum condition determination unit 24, a condition output unit 25, a maximum condition calculation unit 26 and a maximum condition modification unit 27.

The input case generation unit 21 generates two case aggregates, that is, a case aggregate for inputting known cases B and a case aggregate for inputting unknown cases C from the known case aggregate A. The condition output unit 25 outputs both the class of the similar case extracting conditions and an optimum condition selection range stored in advance in the unit 25. The optimum condition selection range is the range of conditions in the case where the similar case extracting condition best suited to make a better prediction is selected.

The maximum condition calculation unit 26 obtains the broadest condition including all conditions outputted by the condition output unit 25, and outputs the condition as the maximum condition. If the case aggregate for inputting known cases B includes an overlapping case which is also included in the case aggregate for inputting unknown cases C, the maximum condition modification unit 27 modifies the maximum condition, and outputs a new maximum condition. If not, the maximum condition modification unit 27 outputs the maximum condition without any modification.

The similar case extraction unit 22 outputs a similar case aggregate satisfying condition outputted by the maximum condition modification unit 27 using the outputs B and C of the input case generation unit 21 as input. If the case aggregate for inputting known cases B outputted by the input case generation unit 21 includes the overlapping case, the similar case deletion unit 23 deletes a case from the similar case aggregate outputted by the similar case extraction unit 22, and modifies the similar case aggregate.

The optimum condition determination unit 24 evaluates the output of the similar case deletion unit 23, selects the similar case extracting condition best suited to make a better prediction from the optimum condition selection range outputted by the condition output unit 25, and outputs the condition.

FIG. 4 shows the configuration of the optimum condition determination unit 24 shown in FIG. 3. An optimum condition determination unit 24 shown in FIG. 4 comprises a condition discretization unit 31, a conditioned similar case extraction unit 32, a prediction result generation unit 33, a condition evaluation unit 34 and an optimum condition selection unit 35.

The condition discretization unit 31 discretizes the optimum condition selection range outputted by the condition output unit 25, and outputs the discretized conditions. The conditioned similar case extraction unit 32 extracts a satisfied similar case aggregate for each of the conditions outputted by the condition discretization unit 31.

The prediction result generation unit 33 makes a prediction for each of the conditions outputted by the condition discretization unit 31 using the output of the conditioned similar case extraction unit 32. The condition evaluation unit 34 evaluates the prediction result outputted by the prediction result generation unit 33, and obtains an evaluation value for each of the conditions outputted by the condition discretization unit 31. The optimum condition selection unit 35 selects the similar case extracting condition best suited to make a better prediction based on the evaluation value outputted by the condition evaluation unit 34.

According to such a configuration, similar cases are extracted by the similar case extraction unit 22 only once, and the optimum similar case extracting condition is automatically determined by the optimum condition determination unit 24. In a prediction based on similar cases, most calculation times are used for the similarity calculation in the extraction of similar cases. Therefore, by performing the extraction of similar cases only once, the calculation time can be greatly reduced compared with the case where a user explicitly repeats the extraction two or more times.

On the other hand, the condition output unit 25 shown in FIG. 3 outputs as the class of similar case extracting conditions, for example, a condition in which the number of similar cases for one unknown case is k, and outputs the inspection range of the value k as an optimum condition selection range. As the range of the value k, for example, integers satisfying $1 \leq k \leq k1$ are designated.

In this case, the optimum condition calculation unit 26 outputs as a maximum condition a condition in which the number of similar cases is k1. The value k1 can be designated by a user or automatically set by the system, for example k1=(square root of the number of cases of a known case aggregate A).

The condition output unit 25 can also output as the class of similar case extracting conditions a condition in which the degree of similarity is equal to or more than a threshold value s, and output the inspection range of the threshold value s as an optimum condition selection range. As the range of the value s, for example, $s1 \leq s \leq s2$ is assumed to be designated. In this case, the maximum condition calculation unit 26 outputs as a maximum condition a condition in which the degree of similarity is s1 or more.

Both the values s1 and s2 can be designated by a user or automatically set by the system. In the latter case, for example, s1 and s2 can be set as s1=$\alpha$/(number of fields of a known case aggregate A) and s2=$\beta$/(number of fields of a known case aggregate A), respectively, using predetermined parameters of $\alpha$=1 and $\beta$=100.

The condition output unit 25 can also output as the class of similar case extracting conditions a condition including both the number of similar cases k and the degree of similarity s. For example, if a similar case extracting condition of ak+b/s$\leq$1 is outputted, the inspection ranges of the following values of parameters a and b are outputted as optimum condition selection ranges.

$$a=0 \text{ or } 1/k1 \leq a \leq 1 \quad (1)$$

$$b=0 \text{ or } s1 \leq b \leq s2 \quad (2)$$

where a>0 or b>0. The values k1, s1 and s2 can be set using the method described above. In this case, the maximum condition calculation unit 26 outputs the following condition as a maximum condition.

$$s \geq s1 \text{ or } k=k1 \quad (3)$$

Figure 5:
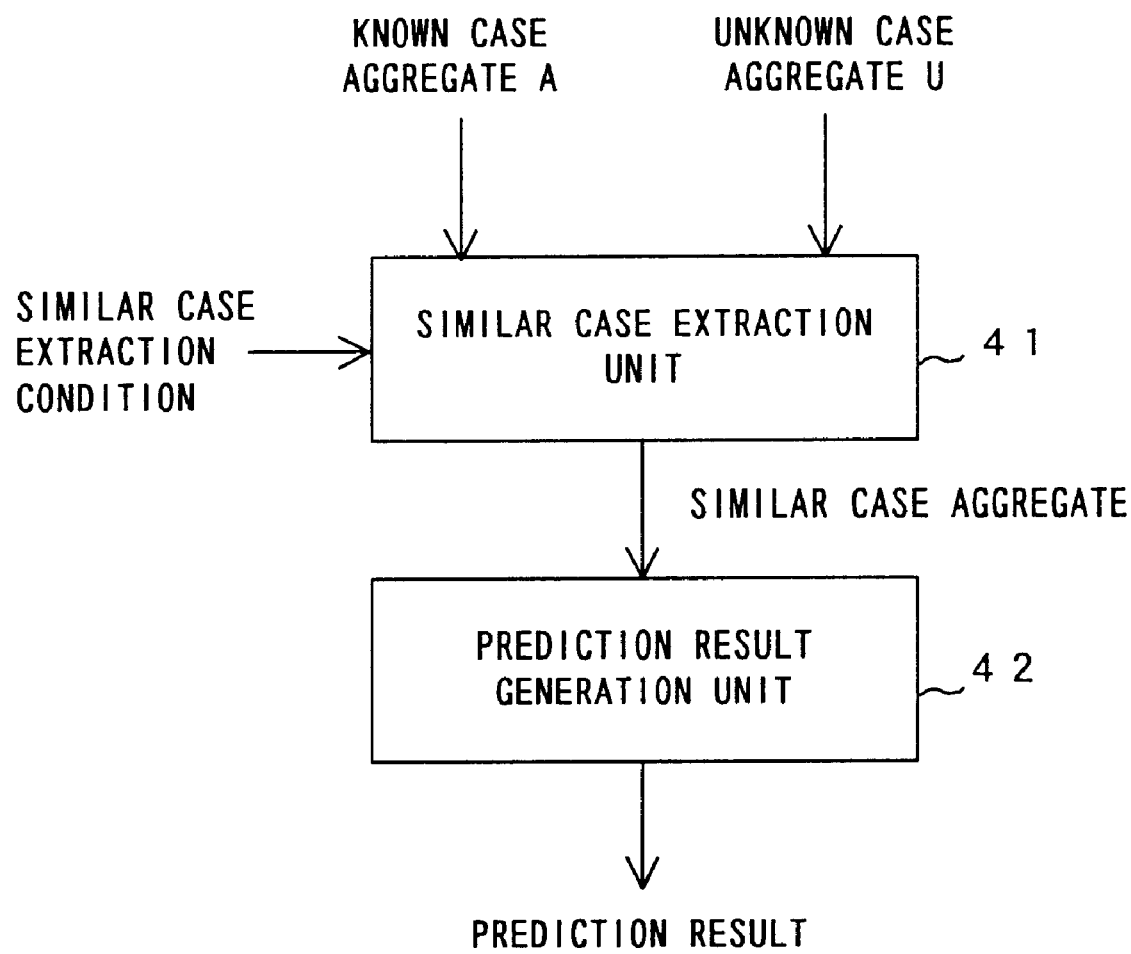
FIG. 5 shows the configuration of a prediction unit.

Next, FIG. 5 shows the configuration of the prediction unit 13 shown in FIG. 2. The prediction unit 13 shown in FIG. 5 comprises a similar case extraction unit 41 and a prediction result generation unit 42. The similar case extraction unit 41 outputs a similar case aggregate satisfying the condition outputted by the similar case extracting condition determination unit 12 using both a known case aggregate A and an unknown case aggregate U as input. The prediction result generation unit 42 makes a prediction using the output of the similar case extraction unit 41, and outputs the prediction result.

Figure 6:
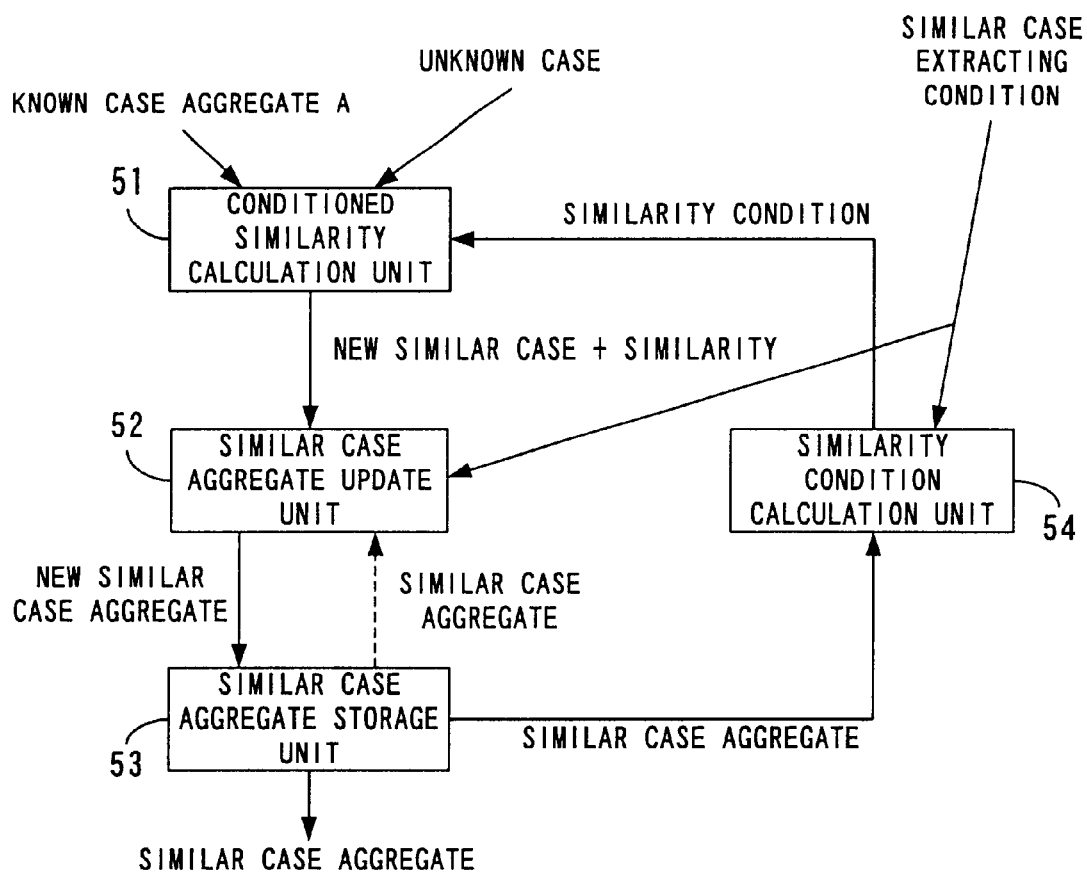
FIG. 6 shows the configuration of a similar case extraction unit.

FIG. 6 shows the configuration of the similar case extraction unit 41 shown in FIG. 5. The similar case extraction unit 41 shown in FIG. 6 comprises a conditioned similarity calculation unit 51, a similar case aggregate update unit 52, a similar case aggregate storage unit 53 and a similarity condition calculation unit 54, and extracts a similar case aggregate from a known case aggregate A for each case of an unknown case aggregate U.

The conditioned similarity calculation unit 51 extracts known cases from the known case aggregate A one by one, calculates the similarity between the known case and an unknown case, and outputs both known cases satisfying the given similarity condition and the degree of similarity of the known cases. However, when it is confirmed that the given condition is not satisfied, the calculation is stopped.

The similar case aggregate update unit 52 adds the output of the conditioned similarity calculation unit 51 to a previously obtained temporary similar case aggregate, removes unnecessary cases to satisfy the similarity case extracting condition, and outputs a new similar case aggregate. The similar case aggregate storage unit 53 stores the output of the similar case aggregate update unit 52 as a present temporary similar case aggregate, and outputs the similar case aggregate to both the similar case aggregate update unit 52 and similarity condition calculation unit 54.

The similarity condition calculation unit 54 calculates a similarity condition, which is a necessary and sufficient condition for a certain case to be newly added to the similar case aggregate, from both the content of the similar case aggregate storage unit 53 and the similar case extracting condition, and outputs the similarity condition to the conditioned similarity calculation unit 51.

In this way, since the conditioned similarity calculation unit 51 stops unnecessary similarity calculation in mid-process according to the similarity condition, similar cases can be extracted from a known case aggregate at high speed, and thereby prediction speed based on similar cases can be improved. The configuration of this similar case extraction unit 41 can also be applied to the similar case extraction unit 22 shown in FIG. 3 to improve the process speed of the similar case extracting condition determination unit 12.

Next, the detailed operations of the above-described prediction apparatus 11 are described below with reference to FIGS. 7 through 49.

FIG. 7 shows the configuration of a first example of the input case generation unit 21 shown in FIG. 3. The input case generation unit 21 shown in FIG. 7 comprises a division unit 61. The input case generation unit 21 divides a known case aggregate A into two groups, outputs one group as a case aggregate for inputting known cases B and outputs the other group as a case aggregate for inputting unknown cases C. For the dividing method for the division unit 61, for example, a random sampling, etc., can be considered.

In this case, it is desirable for the number of the cases of the case aggregate for inputting unknown cases C to be sufficiently smaller than the number of the cases of the known case aggregate A in such a way that an optimum similar case extracting condition does not greatly differ between the known case aggregate A and the case aggregate for inputting known cases B. According to this configuration, since the case aggregate for inputting known cases B includes no case overlapping with an unknown case, both the maximum condition modification unit 27 and the similar case deletion unit 23 output the input without modification.

Figure 8:
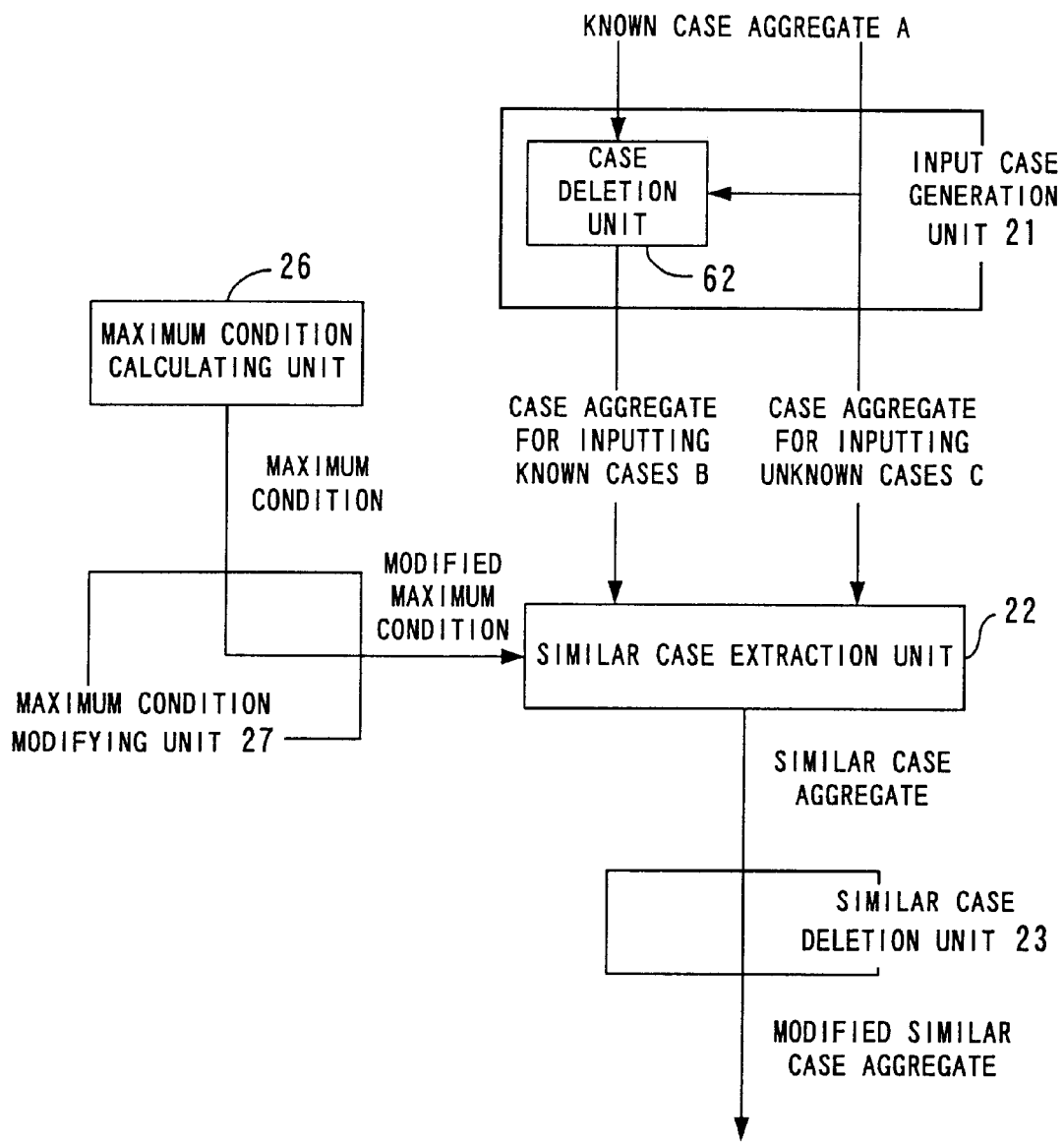
FIG. 8 shows the configuration of a second input case generation unit.

FIG. 8 shows the configuration of a second example of the input case generation unit 21 shown in FIG. 3. The input case generation unit 21 shown in FIG. 8 comprises a case deletion unit 62, and outputs the known case aggregate A as a case aggregate for inputting unknown cases C without modification. The case deletion unit 62 deletes the unknown case from the known case aggregate A for each unknown case of the case aggregate for inputting unknown cases C. Then, the case deletion unit 62 generates a different case aggregate for each unknown case, and designates the case aggregate as a case aggregate for inputting known cases B.

In this case, the case aggregate for inputting known cases B includes no unknown case and can be treated as the case aggregate closest to the known case aggregate A. According to this configuration, since the case aggregate for inputting known cases B includes no case overlapping with an unknown case, both the maximum condition modification unit 27 and similar case deletion unit 23 output the input without modification.

Figure 9:
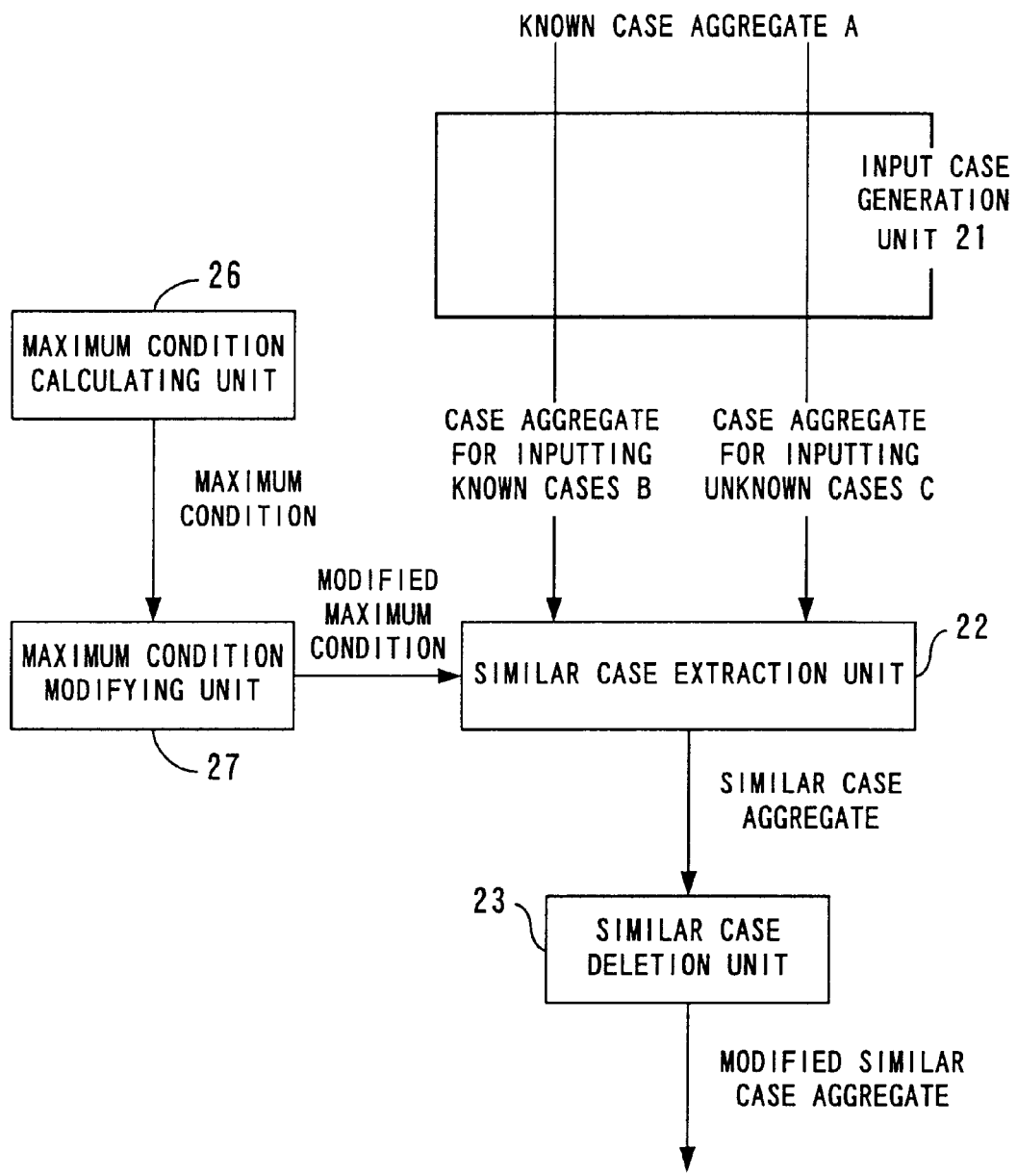
FIG. 9 shows the configuration of a third input case generation unit.

FIG. 9 shows the configuration of a third example of the input case generation unit 21 shown in FIG. 3. The input case generation unit 21 shown in FIG. 9 outputs the known case aggregate A as a case aggregate for inputting unknown cases C, and also outputs the known case aggregate A as a case aggregate for inputting known cases B.

According to this configuration, since the case aggregate for inputting known cases B includes a case overlapping with an unknown case, the maximum condition modification unit 27 modifies the maximum condition so as to extract one extra similar case, and the similar case deletion unit 23 deletes the case overlapping with the unknown case from the similar case aggregate of each unknown case.

Figure 10:
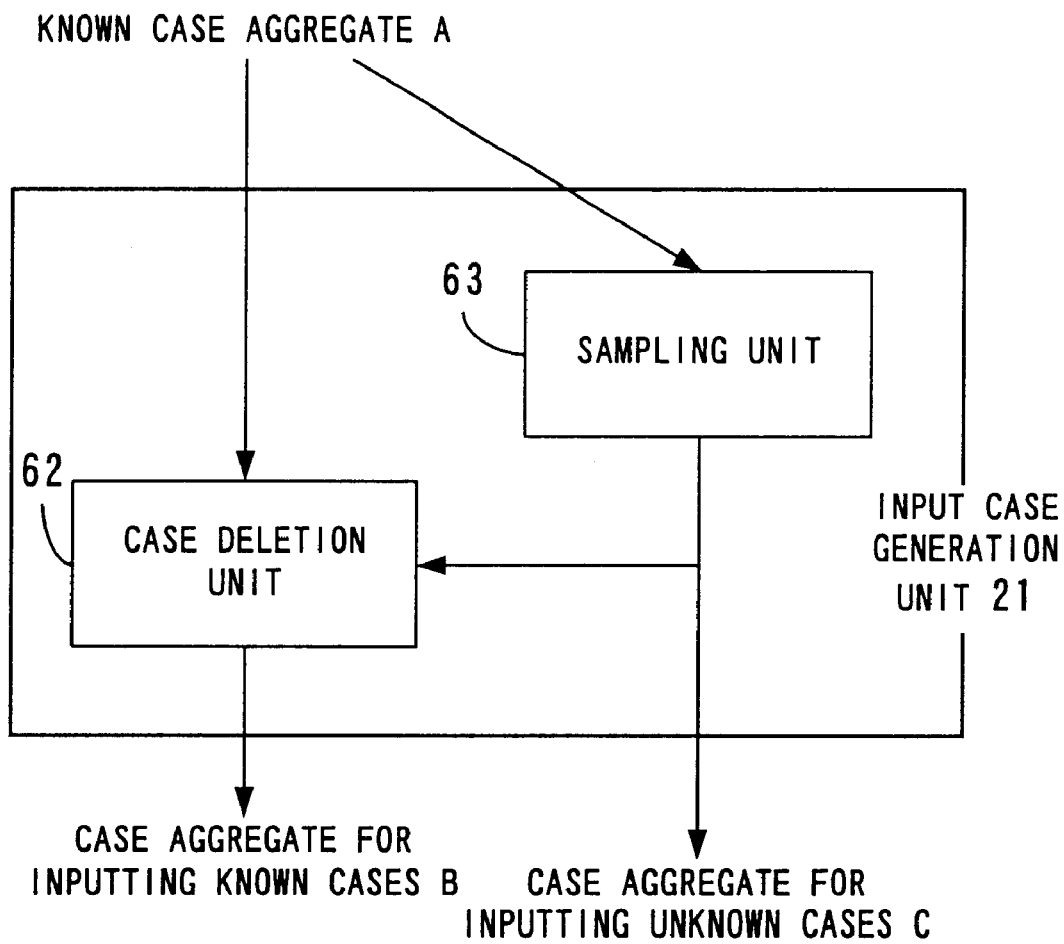
FIG. 10 shows the configuration of a fourth input case generation unit.

FIG. 10 shows the configuration of a fourth example of the input case generation unit 21 shown in FIG. 3. The input case generation unit 21 shown in FIG. 10 has a configuration in which a sampling unit 63 is added to the input case generation unit 21 shown in FIG. 8. If the number of cases of the known case aggregate A exceeds a predetermined number (for example, 1000), the sampling unit 63 samples the cases by way of random sampling, etc. Then, the input case generation unit 21 outputs a part of the known case aggregate A as a case aggregate for inputting unknown cases C.

The case deletion unit 62 deletes the unknown case from the known case aggregate A for each unknown case of the case aggregate for inputting unknown cases C outputted by the sampling unit 63. Then, the case deletion unit 62 generates a different case aggregate for each unknown case, and designates the case aggregate as a case aggregate for inputting known cases B.

According to this configuration, if the known case aggregate A is comparatively large, the size of the case aggregate for inputting unknown cases C can be restricted, and thereby the process speed of the succeeding processes of the similar case extraction unit 22 can be improved.

Figure 11:
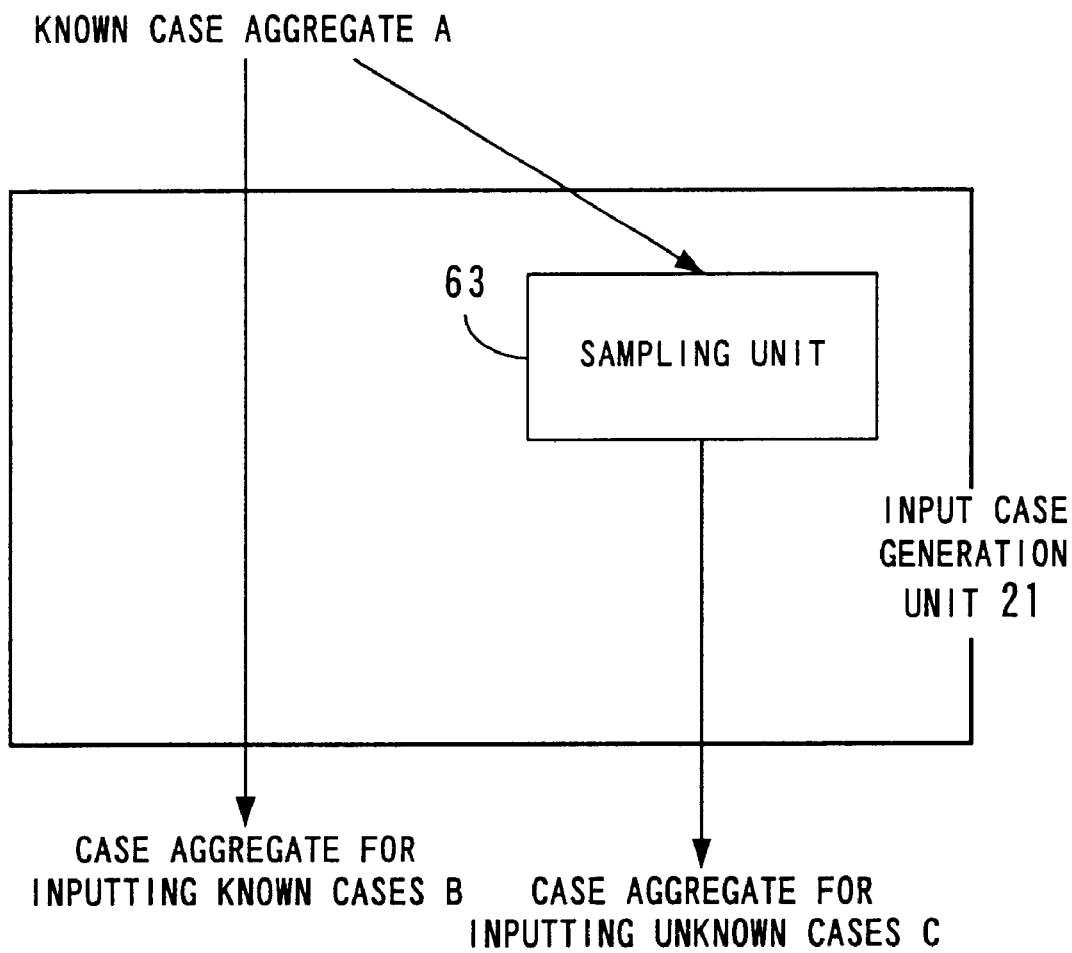
FIG. 11 shows the configuration of a fifth input case generation unit.

FIG. 11 shows the configuration of a fifth example of the input case generation unit 21 shown in FIG. 3. The input case generation unit 21 shown in FIG. 11 has a configuration in which the sampling unit 63 is added to the input case generation unit 21 shown in FIG. 9. The operation of the sampling unit 63 is the same as explained with reference to FIG. 10.

Since according to this configuration, the case aggregate for inputting known cases B includes a case overlapping with an unknown case, the maximum condition modification unit 27 modifies the maximum condition in the same way as in FIG. 9, and the case deletion unit 23 deletes the case overlapping with the unknown case from the similar case aggregate of each unknown case.

Here, the process of the input case generation unit 21 is described using a concrete case aggregate. For example, it is assumed that a known case aggregate A as shown in FIG. 12 is given so as to predict the existence/non-existence of a reply from a direct mail recipient.

In FIG. 12, one row corresponds to one record of a case, "Name" indicates the name of a person for identifying a case. This known case aggregate includes seven cases: "D", "E" and "F". Each case includes the fields of "Age", "Sex", "Occupation", "Marital status" and "Reply", with "Reply" corresponding to a class field.

For example, the case record of "A" shows that the recipient's age is "30", his sex is "male", his occupation as a "public official", he is "married" and he "replied" to the direct mailing. The case record of "C" shows that the recipient's age is "40", her sex is "female", her occupation is "non", she is "married" and she "did not reply" to the direct mailing.

It is assumed here that a sampling is performed using the input case generation unit 21 shown in FIG. 11 and a case aggregate for inputting unknown cases C shown in FIG. 13 is obtained. The case aggregate for inputting unknown cases C shown in FIG. 13 includes four cases: "A", "C", "E" and "G". In this case, for a case aggregate for inputting known cases B, the case aggregate shown in FIG. 12 is used.

The similar case extraction unit 22 shown in FIG. 3 makes predictions according to memory-based reasoning or case-based reasoning and extracts a similar case from the aggregate outputted by the input case generation unit 21. Both in memory-based reasoning and in case-based reasoning, the similar case extraction unit 22 basically performs the same processes. An example of similarity calculation using a similar case extraction unit 22 is described below.

First, the influence on the determination of a class value is calculated. Here, the CCF method widely known as an influence calculation method based on statistical information is assumed to be used. According to this method, field values are divided into several areas for each field including a class field.

For example, if a field corresponds to a category value field, such as "Sex", "Occupation", "Marital status" or "Reply" as shown in FIG. 12, indicating a category, the field values of this field are classified into categories which the field indicates. If a field corresponds to a numerical value field, such as "Age" as shown in FIG. 12, indicating a numerical value, the field values of this field are classified into numerical ranges. However, since the "Age" field indicates discretized numerical values, it can also be handled as a category value field.

If the case number of a known case aggregate and the field number are assumed to be i and j, respectively, and if the value of the field j is included in an area v, conditioned probability in which the value of a class field is included in an area c can be expressed as p(j, v, c). In this case, the weight w(j, v) of the field j is given by the following equation.

$$w(j, v) = \sum_c p(j, v, c)^2 \qquad (4)$$

Then, the distance between two field values is defined. Distance d(j) expressed using the following equation, which is one of the simplest distances between fields is used for an example here.

$$d(j) = \begin{cases} \dfrac{\text{Difference between field values}}{\text{Standard deviation}} & (5) \\ \quad \text{(Numerical value field)} \\ \begin{cases} 0 \text{ (the field values match)} \\ 1 \text{ (the field values do not match)} \end{cases} \\ \quad \text{(Category value field)} \end{cases}$$

According to equation (5), in the case of a numerical value field, a value in which the denominator is a standard deviation obtained from the distribution of field values and the numerator is the difference between the two field values is used for a distance d(j). In the case of a category value field, if the two field values match, d(j) is defined to be 0, and if they do not match, d(j) is defined to be 1.

Then, the similarity between two cases is defined. Degree of similarity S expressed using the following equation, which is one of the simplest degrees of similarity is used as an example here.

$$S = \frac{1}{\sqrt{\sum_j w(j, v(j)) \times d(j)^2}} \quad (6)$$

In equation (6), v (j) indicates an area to which the value of the field j of an unknown case belongs. Since the degree of similarity between cases are defined according to equations (4), (5) and (6), a similar case can be extracted for each unknown case by calculating the degree of similarity between an unknown case and each of all known cases for each unknown case and selecting a known case satisfying the output condition of the maximum condition modification unit 27. Such a similarity calculation can also be applied to the conditioned similarity calculation unit 51 shown in FIG. 6.

For example, if the condition output unit 25 is assumed to output the number of similar cases k as a similar case extracting condition and to output k≦5 as an optimum condition selection range, the maximum condition calculation unit 26 outputs k=5 as a maximum condition. In this case, the maximum condition modification unit 27 modifies the maximum condition to k=6 so as to extract one extra similar case, and the similar case extraction unit 22 extracts similar cases according to the modified maximum condition.

At this time, for example, similar case aggregates as shown in FIGS. 14, 15, 16 and 17 are generated from case aggregates shown in FIGS. 12 and 13. The similar case aggregates shown in FIGS. 14, 15, 16 and 17 indicate case aggregates similar to unknown cases for testings "A", "C", "E" and "G", respectively.

Each of these similar case aggregates is composed of six similar cases corresponding to the modified maximum condition, and those similar cases are arranged in descending order of the degree of similarity. Each similar case aggregate includes the same similar case as the unknown case to be compared, and the degree of similarity of the similar case is expressed using " * * * ".

The similar case deletion unit 23 deletes cases overlapping with unknown cases corresponding to these similar case aggregates and modifies the similar case aggregates. The deletion of overlapping cases from the similar case aggregates shown in FIGS. 14, 15, 16 and 17 results in the generation of similar case aggregates shown in FIGS. 18, 19, 20 and 21, respectively. For example, a case "A" is deleted from the similar case aggregate shown in FIG. 14, and the similar case aggregate shown in FIG. 18 is generated. Each of the modified similar case aggregates is composed of five similar cases corresponding to the maximum condition before modification.

The similar case aggregates modified in this way are inputted to the optimum condition determination unit 24 shown in FIG. 4 and used to determine an optimum similar case extracting condition. The condition discretization unit 31 shown in FIG. 4 discretizes a continuous condition using a predetermined method. The simplest discretization method is a method for determining the number of discretization in advance and discretizing the condition at equal intervals.

For example, if a similar case extracting condition in which the degree of similarity is s or more and if an optimum condition selection range of s1≦s≦s2 are given, the condition can be discretized using the following degree of similarity s(i).

$$s(i)=s1+i*(s2-s1)/100 \quad (7)$$

where i is an integer satisfying 0≦i≦100. According to equation (7), s is discretized into 101 points s(0) through s(100), and corresponding to this, 101 similar case extracting conditions are generated.

If a condition including the number of similar cases or both the number of similar cases and the degree of similarity is given as a similar case extracting condition, the condition can also be discretized using the same method. For example, if both a similar case extracting condition in which the number of similar cases is k and an optimum condition selection range of k≦5 are given, the similar case extracting condition is discretized into five conditions: "number of similar cases=1", "number of similar cases=2", "number of similar cases=3", "number of similar cases=4" and "number of similar cases=5".

Then, the conditioned similar case extraction unit 32 extracts similar cases satisfying each of the discretized conditions from an inputted similar case aggregate and outputs a different similar case aggregate for each condition.

For example, if the similar case aggregates shown in FIGS. 18, 19, 20 and 21 are inputted and a condition of "number of similar cases=1" is set, one similar case for which the degree of similarity is maximized, is extracted from each of the similar case aggregates, and similar case aggregates, as shown in FIGS. 22, 23, 24 and 25, are generated.

If a condition of "number of similar cases=2" is set, two similar cases with the largest and second largest degree of similarity are extracted from each of the similar case aggregates, and similar case aggregates as shown in FIGS. 26, 27, 28 and 29 are generated.

If a condition of "number of similar cases=3" is set, three similar cases with the largest, second largest and third largest degrees of similarity are extracted from each of the similar case aggregates, and similar case aggregates, as shown in FIGS. 30, 31, 32 and 33, are generated.

If a condition of "number of similar cases=4" is set, four similar cases with the largest, second largest, third largest and fourth largest degrees of similarity are extracted from each of the similar case aggregates, and similar case aggregates, as shown in FIGS. 34, 35, 36 and 37, are generated.

Since a condition of "number of similar cases=5" is the same as the condition used by the similar case extraction unit 22, the similar case aggregates shown in FIGS. 18, 19, 20 and 21 are outputted without modification, if this condition is set.

Then, the prediction result generation unit 33 predicts a class field for each condition using the similar case aggregate outputted by the conditioned similar case extraction unit 32. If the prediction result generation unit 33 makes a prediction according to memory-based reasoning, the following processes are executed using both a similar case aggregate and the degree of similarity attached to each of the similar cases.

First, if a class value is a category value, degree of similarity T(c) for each class value is calculated by summing the degree of similarity between cases of similar cases having class value c. Then, by designating the class value for which the degree of similarity T(c) is maximized, as a prediction class value (prediction value) c(predict), the degree of probability P indicating the probability of a prediction value is defined according to the following equation.

$$P = \frac{T(c(predict))}{\sum_c T(c)} \quad (8)$$

T(c(predict)), in the numerator of equation (8), indicates the degree of similarity corresponding to a prediction value c(predict), and the denominator of equation (8) indicates the sum of T(c) for all class values. Therefore, probability P is a positive numerical value of which the maximum value is 1. In addition to such a method for calculating a prediction value, a class value which most frequently appears in the cases of a similar case aggregate can also be used as a prediction value.

If a class value is a continues value, both a prediction value and a degree of probability can be defined according to the following equations.

$$c(predict) = \frac{\sum_i^n S(i)c(i)}{\sum_i^n S(i)} \quad (9)$$

In the above-described equations, n indicates the number of cases included in a similar case aggregate, $$P = \frac{1}{\frac{\sum_i^n S(i)(c(i)-c(predict))^2}{\sigma(c)^2 \sum_i^n S(i)} + 1} \quad (10)$$

S(i) indicates the degree of similarity between cases of a case i (i=1, 2, . . . , n), c(i) indicates the class value of the case i and σ(c) indicates the standard deviation in the distribution of class values c(i). The prediction value and the degree of probability calculated in this way are outputted as prediction results.

For example, since in cases of similar case aggregates for each condition shown in FIGS. 22 through 37, a class field "Reply" is a category value field, the degree of similarity T(c) is calculated for each class value, and a class value corresponding to the maximum T(c) is obtained as a prediction value. As a result, prediction values, as shown in FIG. 38, are obtained.

In a matrix shown in FIG. 38, each row corresponds to one unknown case of a case aggregate for inputting unknown cases C, and each column corresponds to one similar case extracting condition (number of similar cases). Therefore, one element (cell) of the matrix indicates a prediction value in the case where the value of the class field "Reply" of an unknown case corresponds to the row using a similar case aggregate extracted according to a similar case extracting condition corresponding to the column.

For example, in the case of "number of similar cases=1", since each similar case aggregate includes only one case, as shown in FIGS. 22, 23, 24 and 25, the value of "Reply" of the case is adopted as a prediction value.

In the case of "number of similar cases=2", each similar case aggregate includes two cases, as shown in FIGS. 26, 27, 28 and 29. For example, since the similar case aggregate shown in FIG. 26 corresponding to an unknown case "A" includes one case having class value "No" and one case having class value "Yes" and the former case has a larger degree of similarity than the latter case, "No" is adopted as a prediction value.

In the case of "number of similar cases=5", each similar case aggregate includes five cases, as shown in FIGS. 18, 19, 20 and 21. For example, the similar case aggregate shown in FIG. 18 corresponding to an unknown case "A" includes three cases having class value "No" and two cases having a class value "Yes". The total of the degree of similarity of the three former cases is 9.5 and the total of the degree of similarity of the two latter cases is 7. Therefore, the degree of similarity of "No" is larger than the degree of similarity of "Yes" and "No" is adopted as a prediction value.

Figures 39, 40:
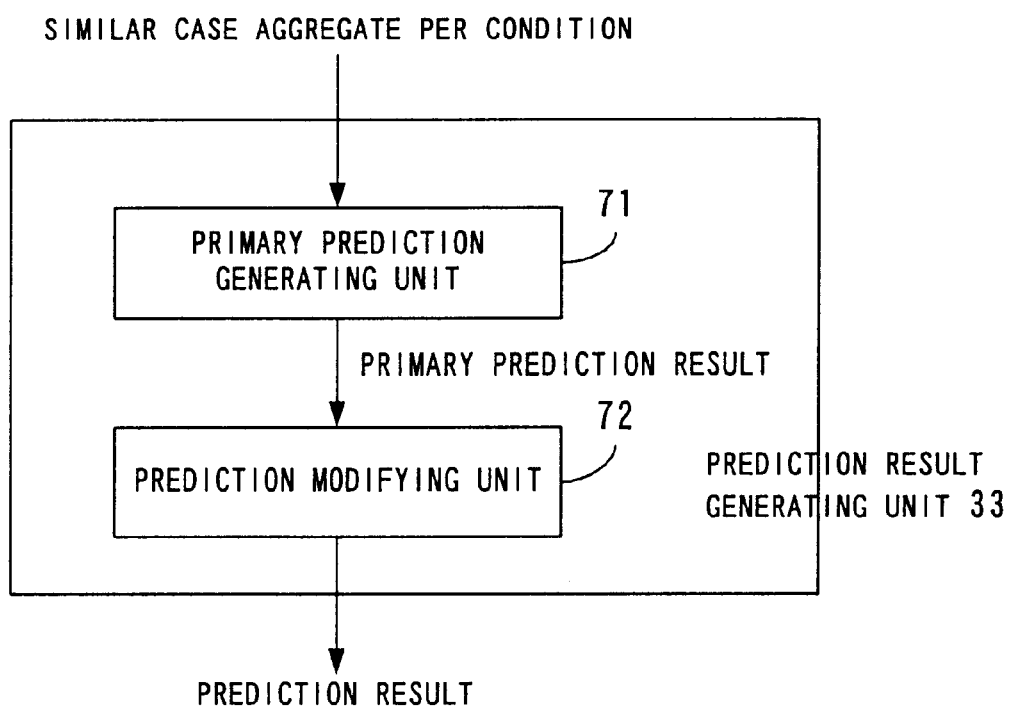
FIG. 39 shows the configuration of a prediction result generation unit.
FIG. 40 shows evaluation values.

Next, if the prediction result generation unit 33 makes a prediction according to case-based reasoning, the prediction result generation unit 33 has a configuration as shown in FIG. 39. The prediction result generation unit according to case-based reasoning and the prediction result generation unit according to memory-based reasoning differ in that the former unit comprises a prediction modification unit 72 and the latter unit does not comprise the prediction modification unit 72.

In FIG. 39, a primary prediction generation unit 71 corresponds to the above-described prediction result generating unit according to memory-based reasoning. The prediction modification unit 72 modifies the primary prediction result outputted by the primary prediction generation unit 71 using trascendental knowledge, etc., and generates the output of the prediction result generation unit 33. The trascendental knowledge indicates an empirical rule based on past prediction results.

The above-described prediction result generation unit 33 according to memory-based reasoning or case-based reasoning can also be used for the prediction result generation unit 42 in the prediction unit 13 shown in FIG. 5.

Next, the condition evaluation unit 34 evaluates a prediction result for each condition using a case aggregate for inputting unknown cases C and generates an evaluation value for each condition. Assuming that the larger is the value of the evaluation value of the class value of an unknown case for testing, the better evaluation result is obtained, and several preferred embodiments of the condition evaluation unit 34 are described below.

First, if a class value is a category value, the condition evaluation unit 34 compares a prediction value outputted by the prediction result generation unit 33 with the class value of an unknown case (true class value), and designates the number of cases matching the prediction value as an evaluation value.

If the prediction results shown in FIG. 38 are evaluated using this evaluation method, evaluation values, as shown in FIG. 40, are obtained. In this case, the value of the class field "Reply" of each case of the case aggregate for inputting unknown cases shown in FIG. 13 is compared with a corresponding prediction value shown in FIG. 38. In the cases of "number of similar cases=1, 2, 4 and 5", since the value of a class field "Reply" and the prediction value of only unknown cases "C" and "E" are matched, the evaluation value becomes "2". In the case of number of similar cases=3", since the value of a class field "Reply" and the prediction value of only unknown cases "A", "C" and "E" are matched, the evaluation value becomes "3".

A result obtained by subtracting the number of cases not matched with a prediction value from the number of cases matched with the prediction value can also be an evaluation value. For example, if it is assumed that the number of the unknown cases of case aggregate for inputting unknown cases C is m and the number of matched cases is m1, the number of unmatched cases becomes m−m1, and an evaluation value becomes m1−(m−m1)=2×m1−m.

If a class value is a continuous value, the condition evaluation unit 34 takes the average of the absolute values of the differences between a prediction value and the class values of unknown cases, and calculates an evaluation value by multiplying an obtained average value by −1. In this case, an evaluation value becomes a negative value.

Although with these evaluation methods an evaluation value is generated using only a prediction value from the output of the prediction result generation unit 33, the evaluation value can also be generated by further using a degree of probability. First, if a class value is a category value, the condition evaluation unit 34 assigns 0 to the initial value of an evaluation value. Then, if a prediction value and the class value of an unknown case are matched, the condition evaluation unit 34 adds the degree of probability of the prediction value to the evaluation value, and if the prediction value and the class value are not matched, the condition evaluation unit 34 subtracts the degree of probability of the prediction value from the evaluation value. Thus, finally an evaluation value in which the degree of probability is taken into consideration can be obtained.

Alternatively, by calculating the weight of a class field using a prediction value and the class value of an unknown case, an evaluation value can be generated by taking the weight into consideration. For example, when a class field takes one of the two values "+" and "−" and a true class value is "+", it is assumed that a user wants to avoid obtaining a prediction value of "−" as much as possible.

In this case, the user designates (prediction value, true class value)=(−, +) as a prediction pattern to be avoided, and the condition evaluation unit 34 sets one of the following weights w according to the combination of a prediction value and the true class value of an unknown case.

In the case of (+, +), w=1.0
In the case of (+, −), w=1.0
In the case of (−, +), w=2.0
In the case of (−, −), w=1.0

Then, 0 is assigned to the initial value of an evaluation value. If the prediction value and the class value of an unknown case are matched for each unknown case, a weight obtained from the combination of the prediction value and the true class value is added to the evaluation value, and if the prediction value and the class value of an unknown case are not matched, the weight is subtracted from the evaluation value. Thus, finally an evaluation value in which the weight of a class field is taken into consideration can be obtained.

If the number of similar cases to be extracted increases, the execution time of some similar case extracting condition become longer. In such a case, an execution time can be estimated from the similar case extracting condition, and a value corresponding to the length of the execution time can also be subtracted from an evaluation value. In this way, the selection of a condition requiring a long execution time from among conditions which have almost same evaluation values can be avoided. An evaluation value in which both an estimated execution time and a real execution time are taken into consideration, can be obtained, for example, using the following equations.

(Estimated execution time)=(Number of known cases)×(Number of fields)+α×(Number of similar cases)   (11)

(Evaluation value)=(Evaluation value before execution time is factored in)−β×(Estimated execution time)   (12)

If in equation (11), the number of similar cases cannot be determined only by the similar case extracting condition, the average of the number of cases of similar case aggregates outputted from the conditioned similar case extraction unit 32 can be used. The parameter α is determined based on the similar case extracting condition and the parameter β is determined based on the importance attached to execution time by a user.

Then, the optimum condition selection unit 35 selects an optimum condition from discretized similar case extracting conditions based on an evaluation value outputted from the condition evaluation unit 34. For example, it is assumed that the number of similar cases is designated as a similar case extracting condition and the distribution of evaluation values, as shown in FIG. 41, is obtained with the number of similar cases and evaluation values on horizontal and vertical axes, respectively.

In this case, since the optimum condition selection unit 35 selects a condition with the best evaluation value, the number of similar cases corresponding to the maximum value encircled is selected. For example, in the case of the evaluation values shown in FIG. 40, "number of similar cases=3" corresponding to the maximum value "3" is selected as the optimum condition.

The optimum condition selection unit 35 can also select an optimum condition using the moving average of evaluation values. In this case, the optimum condition selection unit 35 determines an appropriate area for each condition, and takes an average of the evaluation values of a plurality of conditions included in the area. Then, the optimum condition selection unit 35 designates the obtained average value as the new evaluation value of a corresponding condition, and selects a condition in which the evaluation value is the largest, as the optimum condition. According to such a selection method, even if evaluation values vibrate finely due to noise, a more stable condition can be selected since the evaluation values are smoothly averaged.

Figure 41:
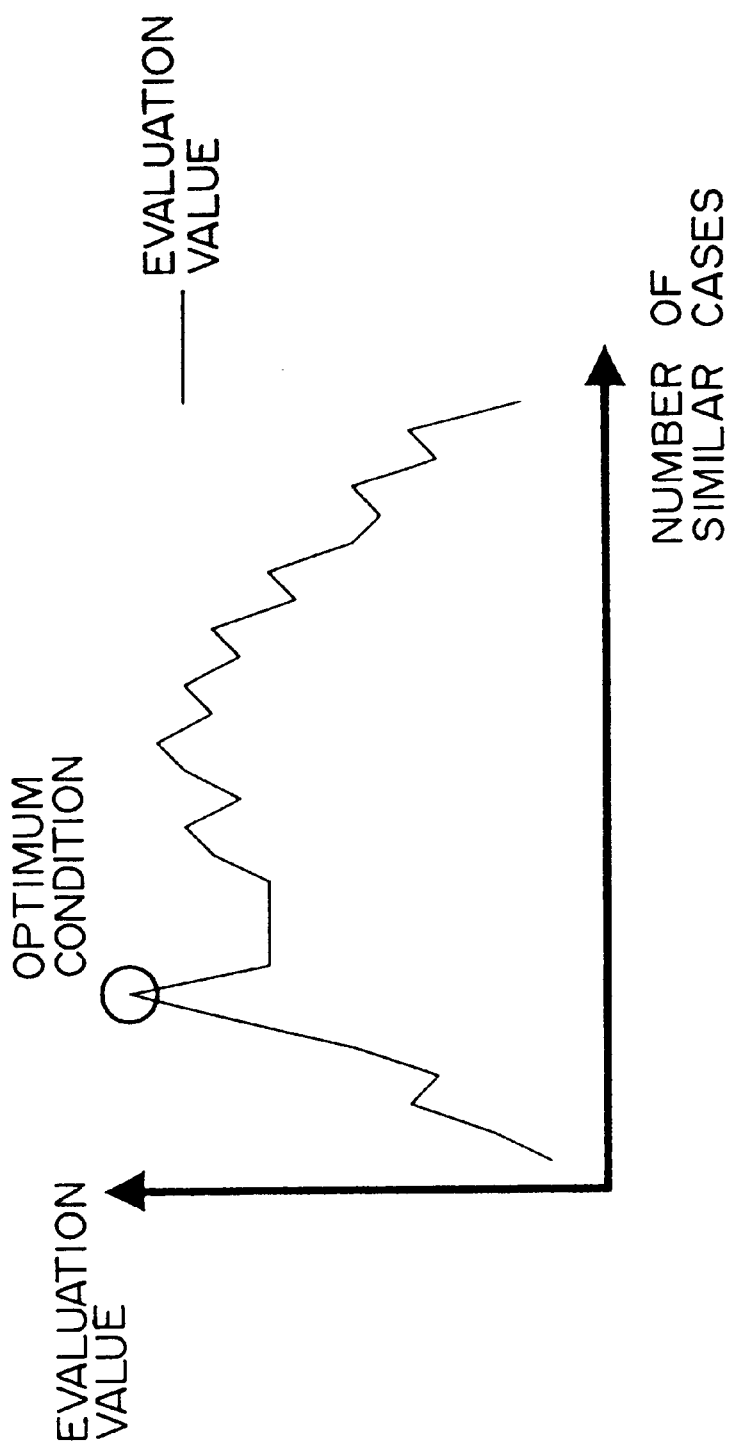
FIG. 41 shows a first optimum condition.
Figure 42:
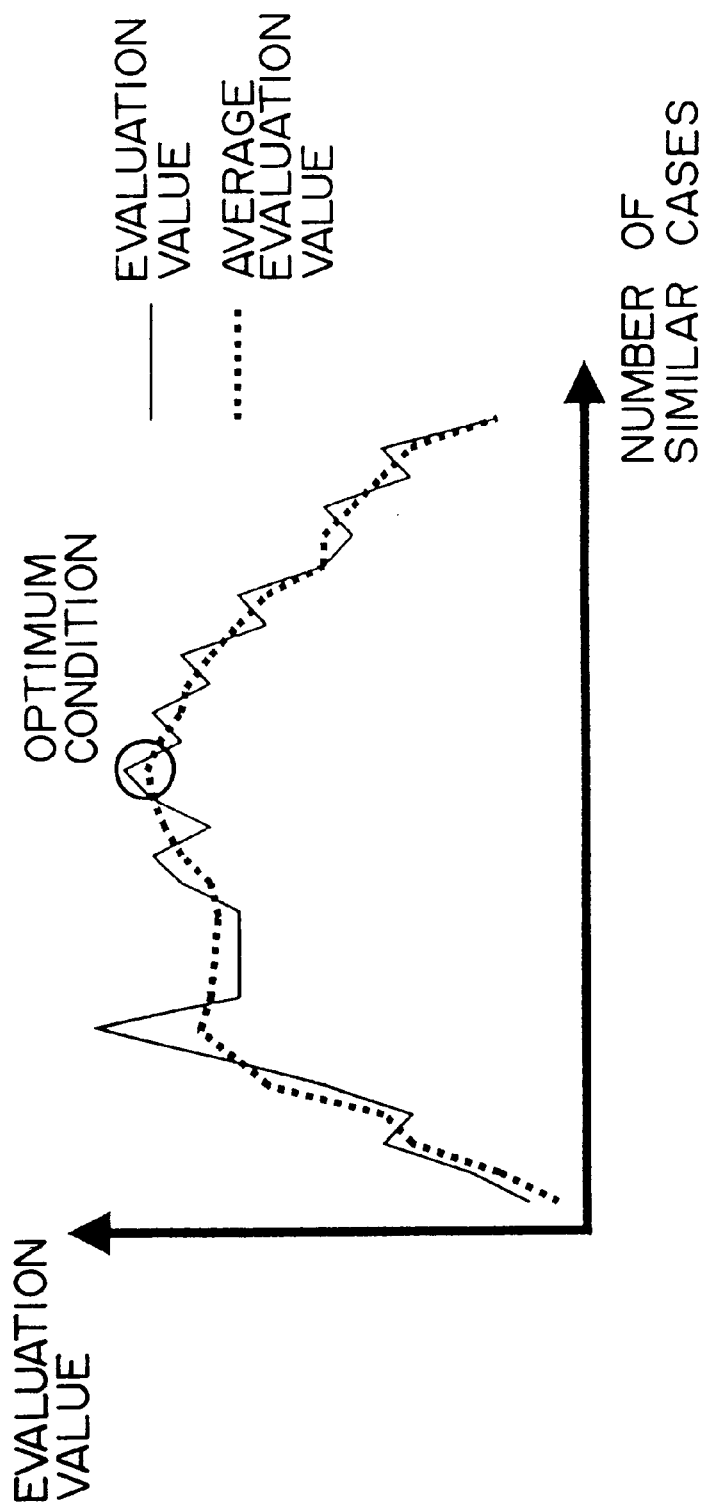
FIG. 42 shows a second optimum condition.

For example, in the case of the evaluation value distribution shown in FIG. 41, average evaluation values as shown in FIG. 42 can be obtained using a moving average. It is assumed here that the area of the moving average corresponding to the number of similar cases k of a reference condition is between MAX(1, k−2) and MIN(k_max, k+2). Provided, however, that MAX( ) indicates that the larger of two parenthesized numerical values is adopted; and that MIN( ) indicates that the smaller of two parenthesized numerical values is adopted. k_max is the maximum value of the number of similar cases.

If the average value of evaluation values corresponding to the number of similar cases in this area is calculated and plotted while incrementing value k from 1 up to k_max, the dotted distribution of average evaluation values is obtained. In this case, the number of similar cases corresponding to the encircled average evaluation value is selected as the optimum condition.

The optimum condition selection unit 35 can also select an optimum condition using the approximation function of evaluation values. In this case, the optimum condition selection unit 35 approximates the distribution of evaluation values over all conditions using an appropriation function, and selects a condition in which the value of the function is the maximum. For this approximation function, for example, the polynomial of degree n of a parameter specifying a condition is used. n is an integer of 1 or more and it is shown experimentally that 4 or 5 is appropriate for n.

Figure 43:
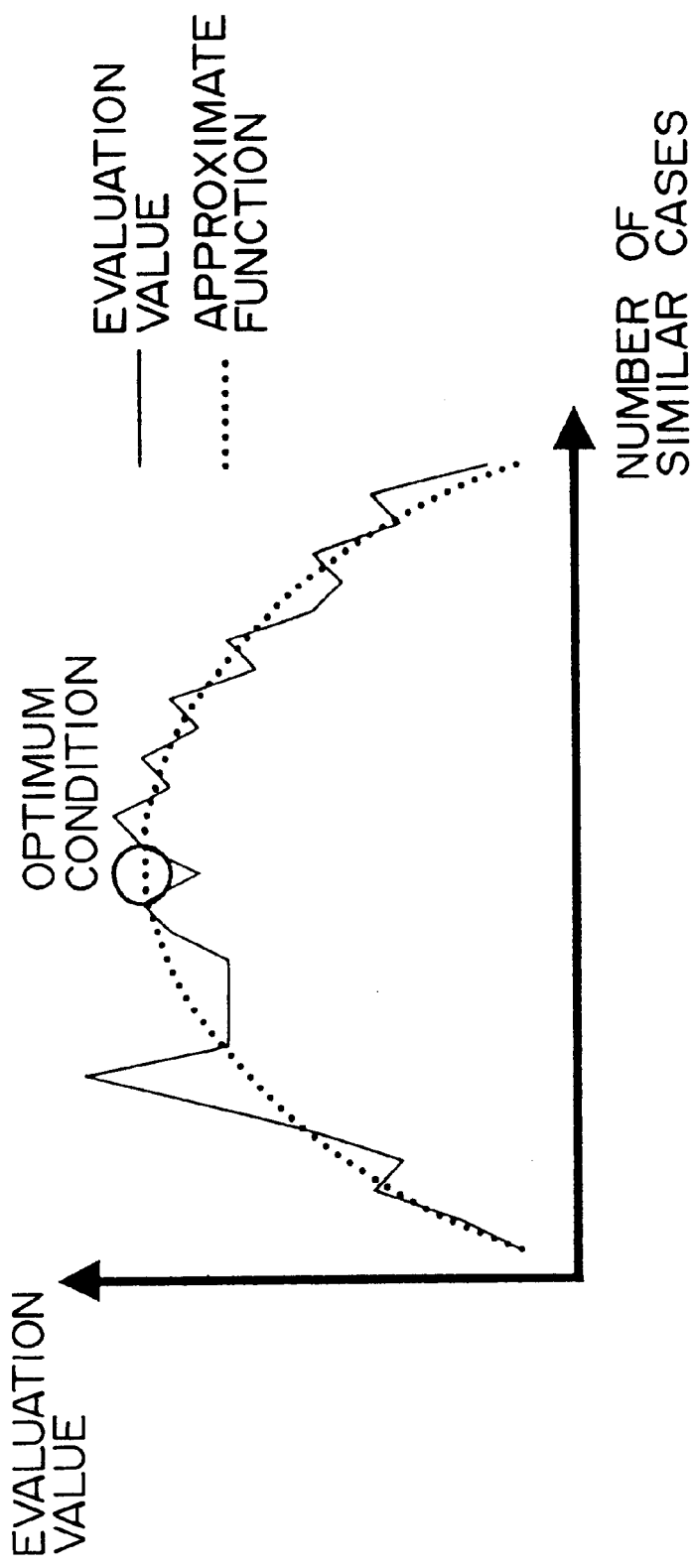
FIG. 43 shows a third optimum condition.

For example, in the case of the evaluation value distribution shown in FIG. 41, evaluation values, as shown in FIG. 43, are obtained using an approximation function. In this example, the polynomial of degree two of the number of similar cases k is used as an approximation function f(k), and the coefficient of each term is determined in such a way that the following value becomes the minimum.

$$\sum_i (y_i - f(k_i))^2 \qquad (13)$$

Provided that $k_i$ and $y_i$ indicate the number of similar cases and the corresponding evaluation value, respectively, shown in FIG. 41. As a result, the dotted approximation function shown in FIG. 43 is obtained, and the number of similar cases corresponding to an encircled function value is selected as the optimum condition.

Each of the above-described selection methods can be applied not only to the number of similar cases, but also to other arbitrary similar case extracting conditions, such as the degree of similarity, etc., in the same way. If a similar case extracting condition including two or more different variables, such as the number of similar cases and the degree of similarity, is given, the selection method shown in FIG. 43 can be adopted by independently obtaining an approximation function for each variable, etc.

As shown in FIG. 2, an optimum similar case extracting condition determined in this way is inputted to the prediction unit 13, and the prediction unit 13 makes predictions for an unknown case aggregate U using the inputted condition. In this way, according to the configuration shown in FIG. 2, by designating a known case aggregate A and an unknown case aggregate D, an optimum similar case extracting condition is automatically determined and a prediction is made based on the condition.

On the other hand, the conditioned similarity calculation unit 51 shown in FIG. 6 included in the prediction unit 13 can use an arbitrary method for calculating the degree of influence other than the existing CCF method in the calculation of the degree of similarity. The same applies to the similar case extraction unit 22 shown in FIG. 3. A calculation method using a weight in such a way that the calculation method is affected by the distribution of the class values of a known case aggregate and the influence on the weight of the change in the distribution of the class values becomes greater than the CCF method, is described below.

First, when the value of a field j is included in an area v, a conditioned probability that the class value is included in the area c, a probability that the class value is included in the area c and the number of class values are assumed to be p(j, v, c), p(c) and N(c), respectively. For example, for a class field of two values, N(c)=2. In this case, the weight w(j, v) of the field j is obtained using the following equation instead of equation (4).

$$q(j, v, c) = \frac{p(j, v, c)}{p(c)} \qquad (14)$$

$$w(j, v) = \frac{\sum_c \left| \frac{q(j, v, c)}{\sum_d q(j, v, d)} - \frac{1}{N(c)} \right|}{2 - \frac{2}{N(c)}} \qquad (15)$$

In equation (14), p(j, v, c) corresponds to the distribution of the class values in a partial aggregate corresponding to the area v in the case where a known case aggregate is divided into partial aggregates according to the values of the field j, and p(c) corresponds to the entire distribution of all the class values. Therefore, the q(j, v, c) in equation (14) indicates the ratio of the distribution of the class values in the partial aggregate of the known case aggregate to the entire distribution of all the class values.

If p(j, v, c) equals p(c), q(j, v, c)=1 results and the numerator of equation (15) becomes 0. Therefore, at this point, a weight w(j, v) becomes a minimum value 0. If p(j, v, c)=1 holds for a specific class value c and p(j, v, c)=0 holds for other class values c, the numerator of equation (15) becomes a maximum value of 2−2/N(c). At this moment, since the denominator of equation (15) matches this maximum value, the weight w(j, v) becomes a maximum value of 1.

In other words, the closer the distribution of the class values of the partial aggregate is to the distribution of all the class values, the smaller the degree of influence of a corresponding field is, and the farther the distribution of the class values of the partial aggregate is from the distribution of all the class values, the greater the degree of influence of a corresponding field is. If the weight w(j, v) obtained using this influence calculation method is used for w(j, v(j)) in equation (6), the distribution of the class values of a known case aggregate can be reflected on a similarity calculation, and even if the distribution of the class values of the known case aggregate is biased, a high-accuracy prediction can be realized.

Next, the detailed operation of the similar case extraction unit 41 shown in FIG. 6 is described. In this example, a similar case extracting condition in which the number of similar cases is k, is assumed to be given. When the sum in the square root of equation (6) is calculated in the similarity calculation, the conditioned similarity calculation unit 51 adds terms corresponding to field numbers in ascending order.

In this addition, the sum monotonically increases, and the degree of similarity S monotonically decreases. Therefore, if a similarity condition for newly adding a known case to a similar case aggregate is assumed to be "S≧S1", it is found that another known case cannot be added to the similar case aggregate when S<S1 is realized.

Under these circumstances, the conditioned similarity calculation unit 51 checks whether S≧S1 is realized at certain intervals. If this condition is not met, the conditioned similarity calculation unit 51 stops the similarity calculation, and starts the similarity calculation of the next known case. Then, the conditioned similarity calculation unit 51 outputs a known case satisfying the similarity condition as a new similar case.

The similar case aggregate update unit 52 extracts a present similar case aggregate from the similar case aggregate storage unit 53, and adds a similar case outputted from the conditioned similarity calculation unit 51 to the similar case aggregate according to the similar case extracting condition. At this moment, if the number of cases of a new similar case aggregate is k or less, the similar case aggregate update unit 52 outputs the similar case aggregate as an update result. If the number of cases of a new similar case aggregate is k+1, the similar case aggregate update unit 52 deletes the case of which the degree of similarity is the minimum and outputs the obtained similar case aggregate as an update result.

The similar case aggregate storage unit 53 stores a similar case aggregate outputted from the similar case aggregate update unit 52. However, in an initial state a similar case aggregate is empty. If the number of cases of a similar case aggregate in the similar case aggregate storage unit 53 is k, the similarity condition calculation unit 54 outputs a similarity condition of "S≧S1". For S1, for example, the minimum value of the degree of similarity of cases in the similar case aggregate is used.

If the number of cases of the similar case aggregate is less than k, the similarity condition calculation unit 54 outputs "No condition". In this case, the conditioned similarity calculation unit 51 outputs any case of any degree of similarity as a similar case without stopping the similarity calculation in mid-process.

In this way, the efficiency of similar case extraction can be improved by determining a condition for stopping the similarity calculation according to both the similar case extracting condition and the degree of similarity of previously obtained similar cases and by stopping the calculation according to the condition.

Next, examples of the processes executed by the major units of the prediction apparatus 11 shown in FIG. 2 are described in detail with reference to flowcharts.

Figure 44:
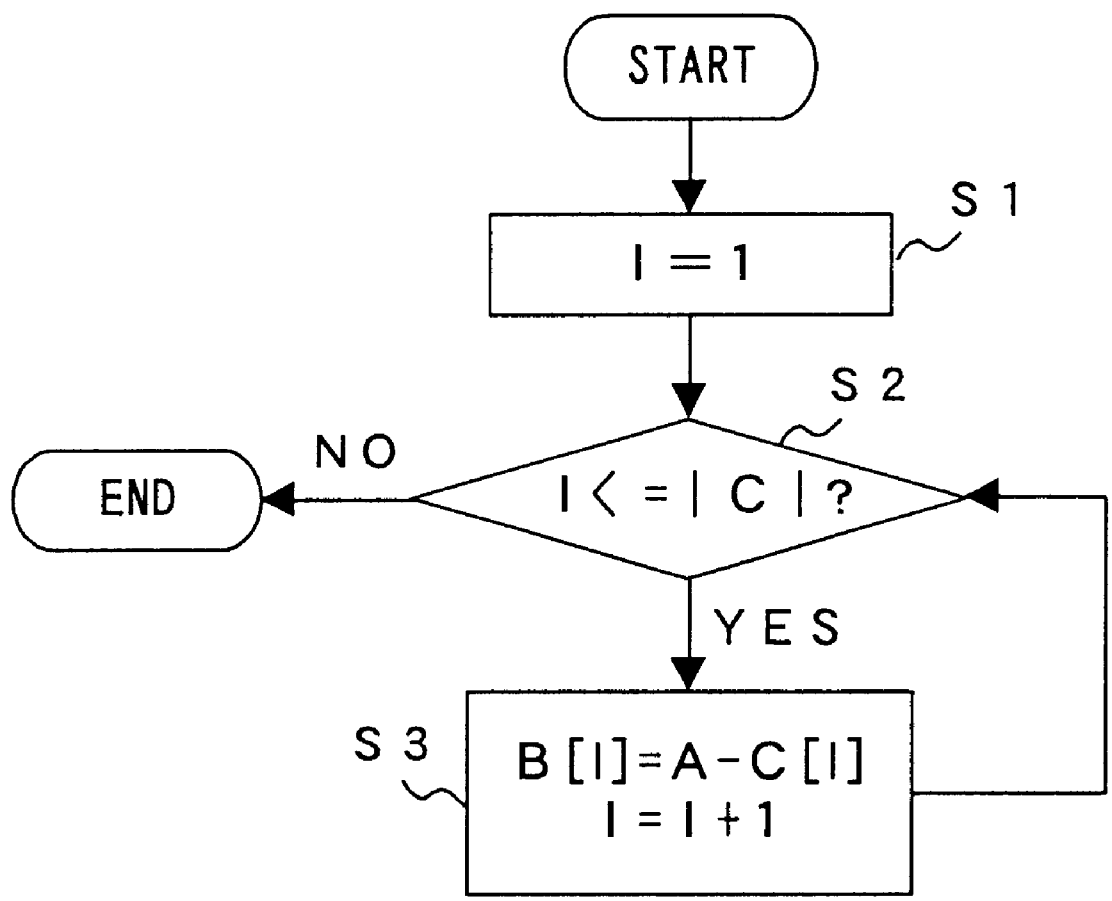
FIG. 44 is a flowchart showing the process of a case deletion unit.

FIG. 44 is a flowchart showing the process of the case deletion unit 62 shown in FIG. 8. The case deletion unit 62 first assigns 1 to a control variable I indicating the number of cases of a case aggregate for inputting unknown cases C (step S1), and compares I with the number of cases ¦C¦ of the case aggregate for inputting unknown cases C (step S2). At this time, the case aggregate for inputting unknown cases C matches a known case aggregate A.

If I≦¦C¦ holds true, the case deletion unit 62 deletes the I-th case C[I] of the aggregate C from the known case aggregate A, generates a case aggregate for inputting known cases B[I] corresponding to the case C[I], sets I+1 to I (step S3), and repeats the processes in steps S2 and after. Then, if in step S2, I>¦C¦ holds true, the case deletion unit 62 outputs the obtained aggregate B[I] as a case aggregate for inputting known cases B and terminates the process.

Figure 45:
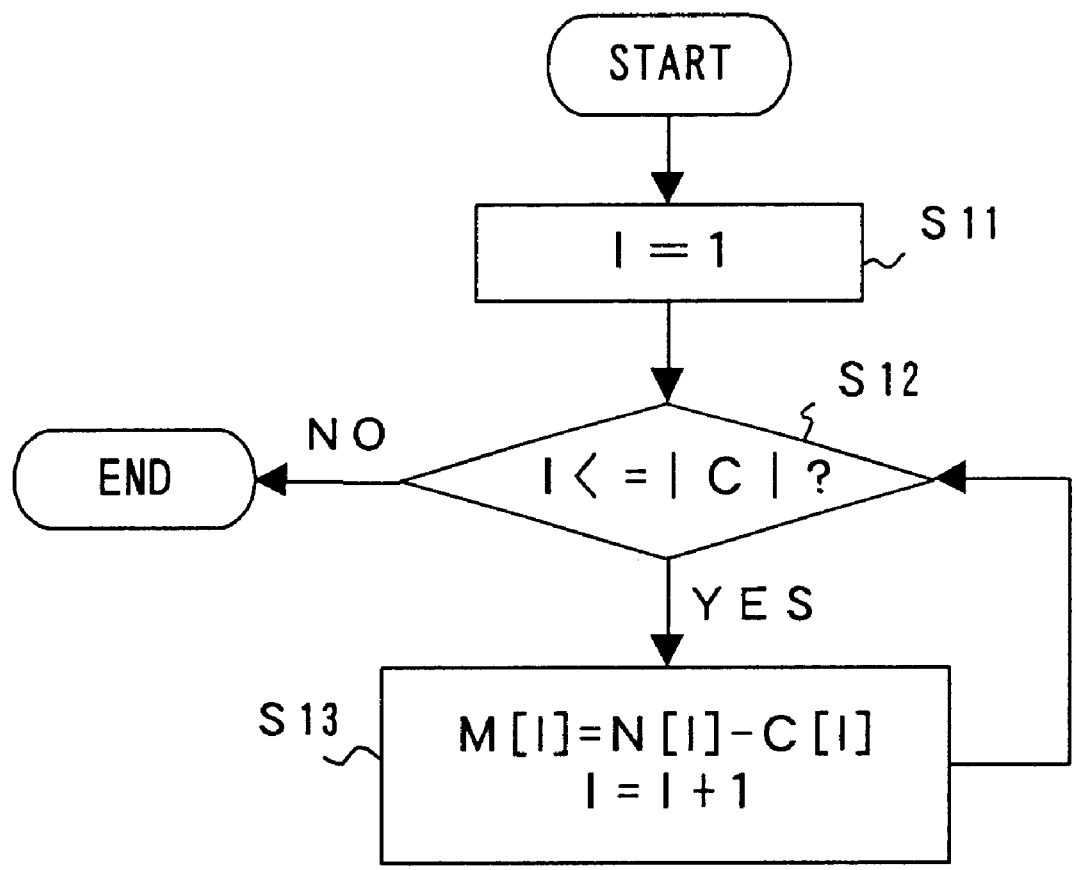
FIG. 45 is a flowchart showing the process of a similar case deletion unit.

Next, FIG. 45 is a flowchart showing the process of the similar case deletion unit 23 shown in FIG. 3. The similar case deletion unit 23 first assigns 1 to a control variable I (step S11), and compares I with the number of cases ¦C¦ of a case aggregate for inputting unknown cases C (step S12).

If I≦¦C¦ holds true, the similar case deletion unit 23 deletes the I-th case C[I] of the aggregate C from a similar case aggregate N[I] corresponding to C[I], and generates a modified similar case aggregate M[I], sets I+1 to I (step S13), and repeats the processes in steps 12 and after. Then, if in step S12, I>¦C¦ holds true, the similar case deletion unit 23 outputs the aggregate M[I] and terminates the process.

Figure 46:
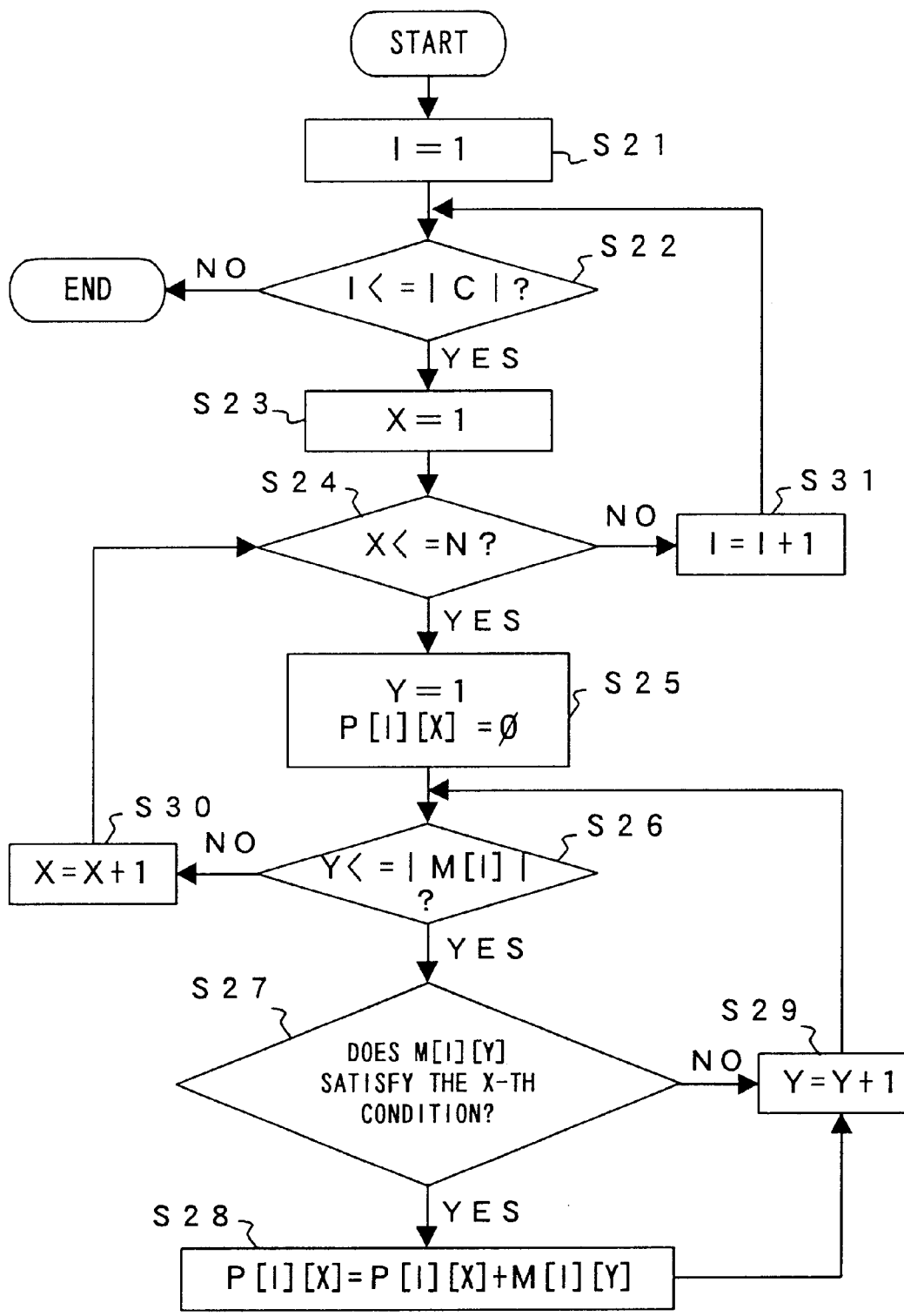
FIG. 46 is a flowchart showing the process of a conditioned case extraction unit.

FIG. 46 is a flowchart showing the process of the conditioned similar case extraction unit 32 shown in FIG. 4. The conditioned similar case extraction unit 32 first assigns 1 to a control variable I (step S21), and compares I with the number of cases ¦C¦ of a case aggregate for inputting unknown cases C (step S22).

If I≦¦C¦ holds true, the conditioned similar case extraction unit 32 assigns 1 to a control variable X indicating the number of discretized conditions (step S23), and compares X with the number of discretized conditions N (step S24). If X≦N holds true, the conditioned similar case extraction unit 32 assigns 1 to a control variable Y indicating the number of cases of a modified similar case aggregate M[I] corresponding to the case C[I], assigns both C[I] and a similar case aggregate P[I][X] for each condition corresponding to the X-th condition to an empty aggregate φ (step S25), and compares Y with the number of cases ¦M[I]¦ of the aggregate M[I] (step S26).

If Y≦¦M[I]¦ holds true, the conditioned similar case extraction unit 32 checks whether the Y-th case M[I][Y] of the aggregate M[I] satisfies the X-th condition (step S27). If the case M[I][Y] satisfies the X-th condition, the conditioned similar case extraction unit 32 adds the case M[I][Y] to the aggregate P[I][X] (step S28), sets Y+1 to Y (step S29), and repeats the processes in steps S26 and after. If the case M[I][Y] does not satisfy the X-th condition, the conditioned similar case extraction unit 32 repeats the processes in steps S29 and after without adding the case M[I][Y] to the aggregate P[I][X].

Then, if in step S26, Y>¦M[I]¦ holds true, the conditioned case similar extraction unit 32 sets X+1 to X (step S30) and repeats the processes in steps S24 and after. Then, if in step S24, X>N holds true, the conditioned similar case extraction unit 32 sets I+1 to I (step S31) and repeats the processes in steps S22 and after. Then, if in step S22, I>¦C¦ holds true, the conditioned similar case extraction unit 32 outputs the obtained similar case aggregate P[I][X] and terminates the process.

Figure 47:
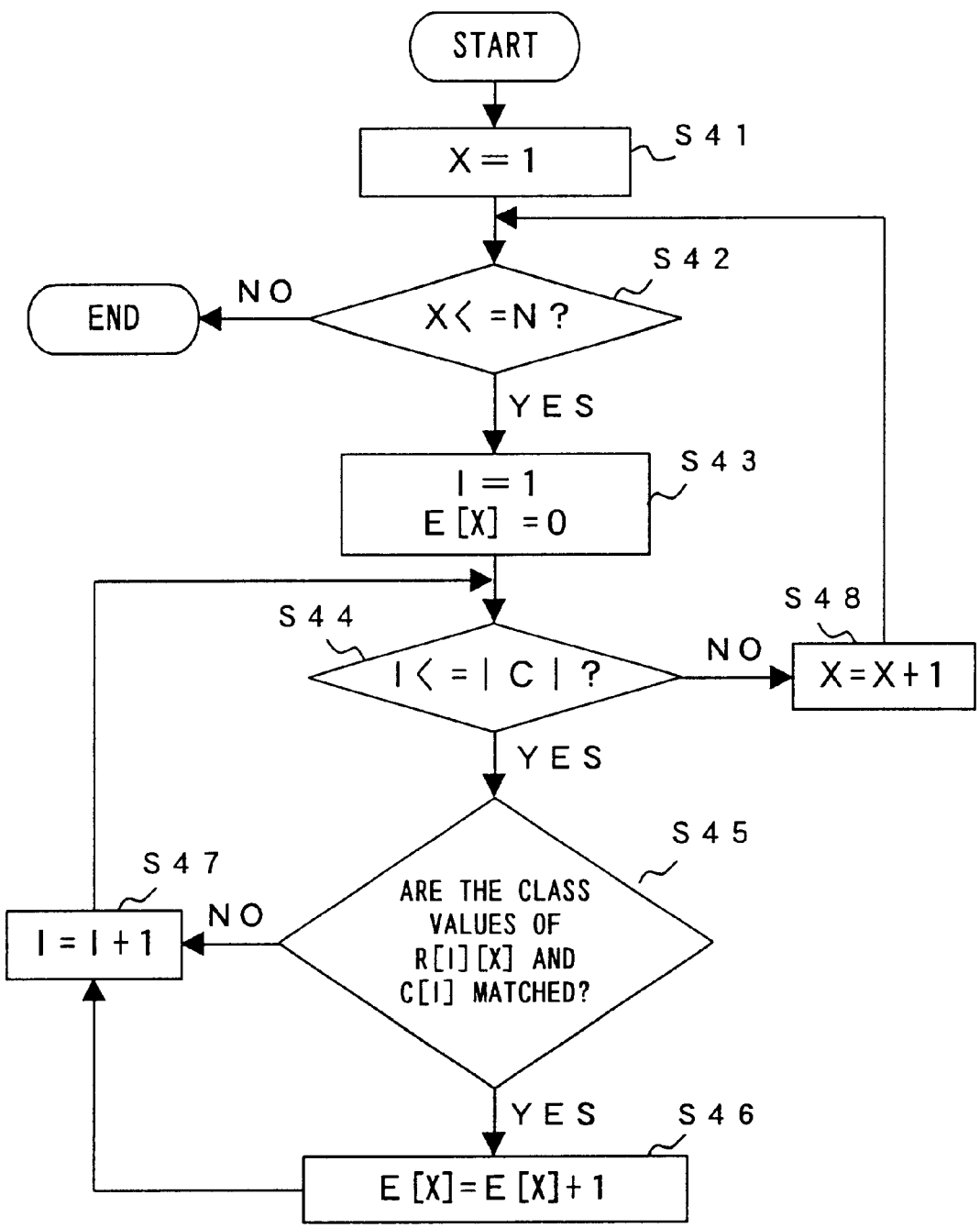
FIG. 47 is a flowchart showing the process of a condition evaluation unit.

FIG. 47 is a flowchart showing the process of the condition evaluation unit 34 shown in FIG. 4. In this example, the number of prediction values matching a true class value is used for an evaluation value assuming the case where the class value of a case of a case aggregate for inputting unknown cases C is a category value.

The condition evaluation unit 34 first assigns 1 to a control variable X (step S41), and compares X with the number of conditions N (step S42). If X≦N holds true, the condition evaluation unit 34 assigns 1 to a control variable I, assigns 0 to the evaluation value E[X] of the X-th condition (step S43) and compares I with the number of cases ¦C¦ of the case aggregate for inputting unknown cases C (step S44).

If I≦¦C¦ holds true, the condition evaluation unit 34 compares the prediction value R[I] [X] of the case C[I] corresponding to the X-th condition with the class value of C[I] (step S45). If R[I][X] matches the class value of C[I], the condition evaluation unit 34 adds 1 to E[X] (step S46), sets I+1 to I (step S47), and repeats the processes in steps S44 and after. If R[I][X] does not match the class value of C[I], the condition evaluation unit 34 repeats the processes in steps S47 and after without updating E[X].

Then, if in step S44, I>¦C¦ holds true, the condition evaluation unit 34 sets X+1 to X (step S48) and repeats the processes in step S42 and after. Then, if in step S42, X>N holds true, the condition evaluation unit 34 outputs the obtained evaluation value E[X] and terminates the process.

FIG. 48 is a flowchart showing the process of the optimum condition selection unit 35 shown in FIG. 4. In this example, a selection method based on a moving average shown in FIG. 42 is used. The optimum condition selection unit 35 first assigns 1 to a control variable X, assigns 1 to a control variable MAX indicating an optimum condition number (step S51) and compares X with the number of cases N (step S52).

If X≦N holds true, the optimum condition selection unit 35 designates an aggregate of conditions included in a predetermined area having the X-th condition as a reference, as S[X], assigns 1 to a control variable Z indicating a condition number of a condition in the aggregate S[X] and assigns 0 to the average evaluation value F[X] of the X-th condition (step S53). Then, the optimum condition selection unit 35 compares Z with the number of conditions ¦S[X]¦ of the aggregate S[X] (step S54).

If Z≦¦S[X]¦ holds true, the optimum condition selection unit 35 adds the evaluation value E[S[X][Z]] of the Z-th condition S[X][Z] of S[X] to F[X], sets Z+1 to Z (step S55) and repeats the processes in step S54 and after. Thus, the sum of the evaluation values of conditions in S[X] is stored in F[X].

Then, if Z>¦S[X]¦ holds true, the optimum condition selection unit 35 obtains an average evaluation value by dividing F[X] by |S[X]|, stores the average evaluation value in F[X] (step S56) and compares F[X] with F[MAX] (step S57). If F[X]>F[MAX] holds true, the optimum condition selection unit 35 sets X to MAX (step S58), sets X+1 to X (step S59) and repeats the processes in steps S52 and after. If F[X]≦F[MAX] holds true, the optimum condition selection unit 35 repeats the processes in steps 59 and after without updating MAX.

Then, if in step S52, X>N holds true, since the maximum value of the average evaluation value is F[MAX], the optimum condition selection unit 35 outputs the corresponding MAX-th condition as the optimum condition (step S60), and terminates the process.

Figure 49:
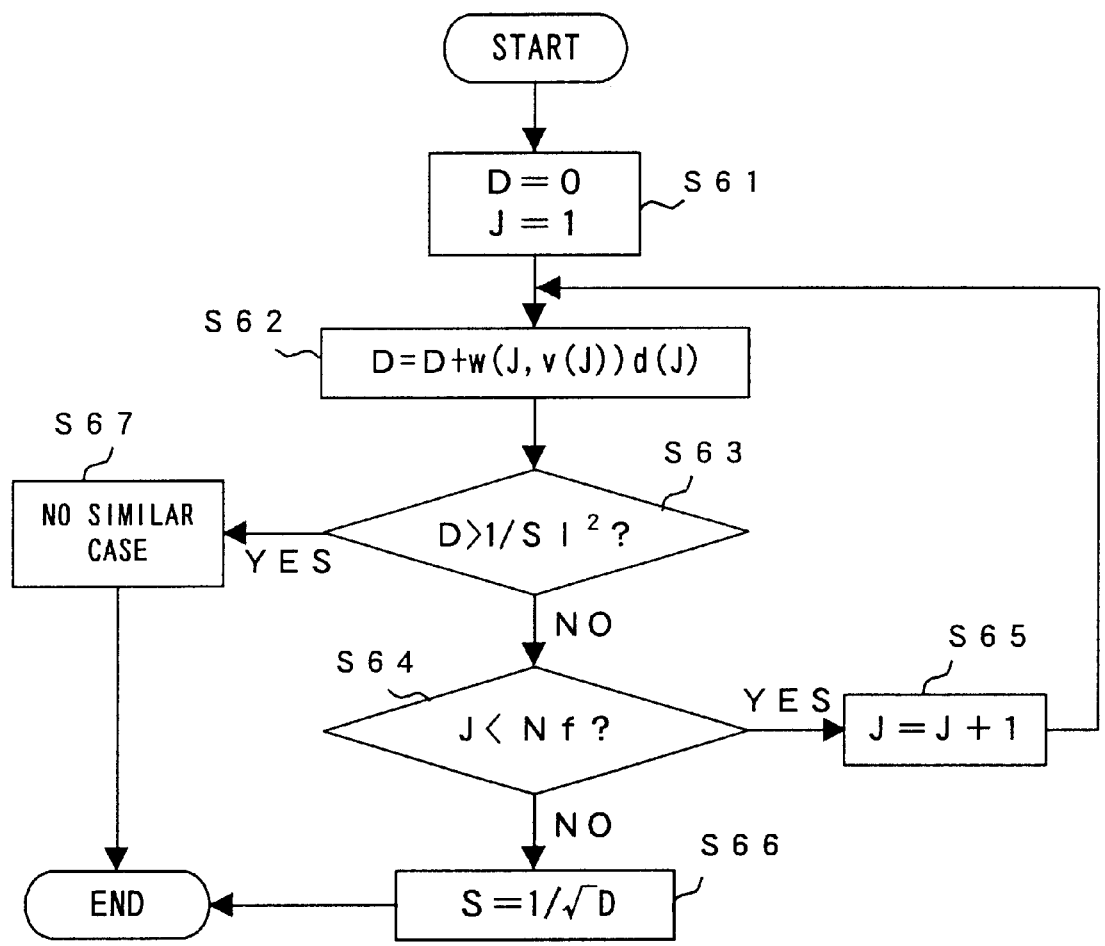
FIG. 49 is a flowchart showing the process of a conditioned similarity calculation unit.

FIG. 49 is a flowchart showing the process of the conditioned similarity calculation unit 51 shown in FIG. 6. In this example, the degree of similarity S between a known case and an unknown case is calculated according to equation (6), and "S≧S1" is used as a similarity condition.

The conditioned similarity calculation unit 51 first assigns 0 to a variable D indicating the sum in the square root of equation (6), assigns 1 to a control variable J indicating the number of fields of the known case (step S61) and adds w(J, v(J))d(J)$^2$ to D (step S62). Since at this time a similarity condition "S=1/(D)$^{1/2}$≧S1" is rewritten as "D≦1/S1$^2$", the conditioned similarity calculation unit 51 compares D with 1/S1$^2$ (step S63).

If D≦1/S1$^2$ holds true, the conditioned similarity calculation unit 51 compares J with the number of fields Nf (step S64). If J<Nf holds true, the conditioned similarity calculation unit 51 sets J+1 to J (step S65) and repeats the processes in steps S62 and after. Then, if in step S64, J=Nf holds true, the conditioned similarity calculation unit 51 assigns the reciprocal number of the square root of the obtained D to the degree of similarity S (step S66) and terminates the process.

If in step S63, D>1/S1$^2$ holds true, the conditioned similarity calculation unit 51 judges that the known case cannot become a similar case (step S67), stops the similarity calculation and terminates the process.

The prediction apparatus 11 described above can be applied to an arbitrary data classification process. FIG. 50 shows the configuration of the data classification apparatus including the prediction apparatus 11. The data classification apparatus shown in FIG. 50 comprises a prediction apparatus 11, a known case database 81, an unknown case database 82, an input device 83, an classification device 84 and an output device 85.

The known case database 81 and unknown case database 82 store known case aggregates and unknown case aggregates, respectively, and the input device 83 inputs case aggregates from the known case database 81 and unknown case database 82 to the prediction apparatus 11. The prediction apparatus 11 predicts the class field of each unknown case using a known case aggregate and outputs the prediction result. The classification device 84 classifies unknown cases according to the prediction value of the class field, and the output device 85 outputs the classification result on a display panel, etc.

For example, unknown cases having a field configuration as shown in FIG. 12 are classified into two groups according to whether the prediction value of a class field "Reply" is "Yes" or "No", and a group where the prediction value is "Yes" is outputted as the destination of a direct mailing. In this case, the output device 85 not only outputs the classification result, but also automatically connects the data classification apparatus to communications network 86 and thereby can also transmit a piece of electronic mail, including an appropriate message, to the designated destinations.

According to such a data classification apparatus, the targets of a direct mailing and a questionnaire, loan targets of financial institutes, etc., can be selected from many unknown cases or parties to an insurance contract as unknown cases can be classified.

By designating the component units of an apparatus or network as unknown cases and classifying the unknown cases with the existence/non-existence of a failure as a class field, the location of a failed unit can also be estimated. In this case, the output device 85, for example, transmits an appropriate control signal or control message to the component unit which is estimated to fail, controls the unit and restores operation to the unit.

The data classification apparatus shown in FIG. 50 can be configured using an information processing device (computer) shown in FIG. 51. The information processing device shown in FIG. 51 comprises a CPU (central processing unit) 91, a memory 92, an input device 93, an output device 94, an external storage device 95, a medium drive device 96 and a network connection device 97. And, these devices are connected using a bus 98.

The memory 92 includes, for example, a ROM (read only memory), a RAM (random access memory), etc., and stores a program and data to be used for the process. The CPU 91 executes the program using the memory 92 and performs necessary processes.

The similar case extracting condition determination unit 12 and prediction unit 13 shown in FIG. 2; the input case generation unit 21, similar case extraction unit 22, similar case deletion unit 23, optimum condition determination unit 24, condition output unit 25, maximum condition calculation unit 26 and maximum condition modification unit 27 shown in FIG. 3; the condition discretization unit 31, conditioned case extraction unit 32, prediction result generation unit 33, condition evaluation unit 34 and optimum condition selection unit 35 shown in FIG. 4; the similar case extraction unit 41 and prediction result generation unit 42 shown in FIG. 5; the conditioned similarity calculation unit 51, similar case aggregate update unit 52, similar case aggregate storage unit 53 and similarity condition calculation unit 54 shown in FIG. 6; the classification device 84 shown in FIG. 50, etc., correspond to software components including a set of instructions stored in the specific program segment of the memory 92.

The input device 93 is, for example, a keyboard, a pointing device, a touch panel, and is used to input instructions and information from a user. The output device 94 is, for example, a monitor display, a printer, and is used to output inquiries, process results, etc., to a user.

The external storage device 95 is, for example, a magnetic disk device, an optical disk device, a magneto-optical disk device. This external storage device 95 can store the program and data described above, and the program and data are used by loading them to the memory 92, as the situation requires.

The medium drive device 96 drives a portable storage medium 99, and accesses the recorded content. For the portable storage medium 99, an arbitrary computer-readable storage medium, such as a memory card, a floppy disk, a CD-ROM (compact disk read-only memory), an optical disk, a magneto-optical disk, etc., can be used. This portable storage medium 99 can store the program and data described above, and the program and data are used by loading them to the memory 92, as the situation requires.

The network connection device 97 communicates with an external device through an arbitrary network (line), such as a LAN (local area network), etc., and performs data conversion when transmits/receives data. The program and data described above can be received from an external device and used by loading them to the memory 92, as the situation requires.

For example, the known case database 81, unknown case database 82 and input device 83 shown in FIG. 50 correspond to the external storage device 95, and the output device 85 shown in FIG. 50 corresponds to the output device 94 and network connection device 97.

Figure 52:
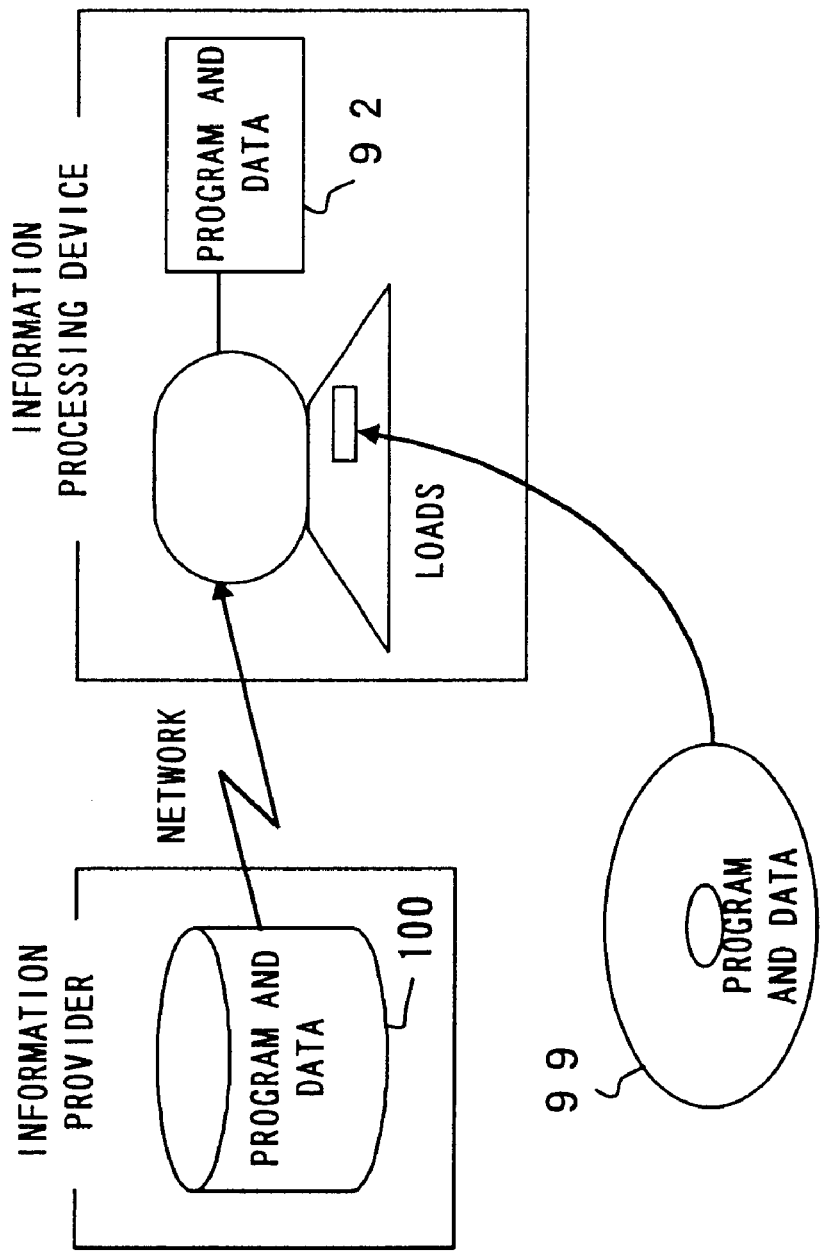
FIG. 52 shows storage media.

FIG. 52 shows examples of the computer-readable storage media capable of supplying the information processing device shown in FIG. 51 with a program and data. The program and data stored in the portable storage medium 99 or an external database 100 are loaded to the memory 92. Then, the CPU 91 executes the program using the data, and performs the necessary processes.

According to the present invention, in a prediction based on similar cases, the speed of prediction can be improved without pretreating a known case aggregate. A good similar case condition can also be automatically obtained at high speed without repeating the extraction of similar cases. Furthermore, even if the distribution of the class values of a known case aggregate is biased, a high-accuracy prediction can be realized.

In this way, according to the present invention, a high-speed and high-accuracy prediction can be realized, and the present invention greatly contributes to a variety of data classification processes.

What is claimed is:

1. A prediction apparatus for making a prediction based on similar cases, comprising:

determining means for automatically determining a similar case extracting condition to extract one or more pieces of similar case data similar to unknown case data from an aggregate of known case data consisting of one or more fields; and predicting means for extracting the one or more pieces of similar case data using the similar case extracting condition determined by the determining means, predicting a value of an unknown field of the unknown case data, and outputting a prediction value.

2. The prediction apparatus according to claim 1, wherein said determining means evaluates a plurality of similar case extracting conditions and selects an appropriate similar extracting condition based on an evaluation result.

3. The prediction apparatus according to claim 1, wherein said determining means includes:

condition outputting means for outputting both class information for designating a class of the similar case extracting condition and range information for designating a range of the designated similar case extracting condition;

maximum condition calculating means for obtaining a maximum condition including an output of the condition outputting means;

input case generating means for generating both an aggregate of case data for inputting known cases and an aggregate of case data for inputting unknown cases from the aggregate of the known case data;

similar case extracting means for extracting an aggregate of similar case data similar to the case data for inputting unknown cases from the aggregate of the case data for inputting known cases according to the maximum condition; and condition determining means for selecting an appropriate similar case extracting condition from the range of the similar case extracting condition using the aggregate of the similar case data, and outputting information about the appropriate similar case extracting condition.

4. The prediction apparatus according to claim 3, wherein said condition outputting means outputs a number of similar cases as the class information and outputs a range of the number of similar cases as the range information.

5. The prediction apparatus according to claim 3, wherein said condition outputting means outputs a threshold value of a degree of similarity as the class information and outputs a range of the threshold value as the range information.

6. The prediction apparatus according to claim 3, wherein said condition outputting means outputs a conditional expression including both the number of similar cases and a degree of similarity as the class information and outputs an inspection range of the conditional expression as the range information.

7. The prediction apparatus according to claim 3, wherein said input case generating means divides the aggregate of the known case data into two groups, outputs one group as the aggregate of the case data for inputting known cases and outputs the other group as the aggregate of the case data for inputting unknown cases.

8. The prediction apparatus according to claim 3, wherein said input case generating means outputs the aggregate of the known case data as the aggregate of the case data for inputting unknown cases and outputs an aggregate obtained by deleting one piece of the case data for inputting unknown cases from the aggregate of the known case data, as an aggregate of case data for inputting known cases for the one piece of the case data for inputting unknown cases.

9. The prediction apparatus according to claim 3, wherein said input case generating means outputs an aggregate obtained by sampling one or more pieces of case data from the aggregate of the known case data as the aggregate of the case data for inputting unknown cases and outputs an aggregate obtained by deleting one piece of the case data for inputting unknown cases from the aggregate of the known case data as an aggregate of case data for inputting known cases for the one piece of the case data for inputting unknown data.

10. The prediction apparatus according to claim 3, wherein said determining means further includes:

maximum condition modifying means, when the aggregate of the case data for inputting known cases includes case data overlapping with the case data for inputting unknown cases, for modifying the maximum condition and outputting the maximum condition to said similar case extracting means; and similar case deleting means, when the maximum condition is modified, for deleting case data from the aggregate of the similar case data outputted by said similar case extracting means, and outputting a modified aggregate of similar case data to said condition determining means.

11. The prediction apparatus according to claim 10, wherein said input case generating means outputs the aggregate of the known case data as both the aggregate of the case data for inputting unknown cases and the aggregate of the case data for inputting known cases, said maximum condition modifying means modifies the maximum condition so as to increase the number of similar cases by one, and said similar case deleting means deletes case data overlapping with one piece of case data for inputting unknown cases from an aggregate of similar case data for the one piece of the case data for inputting unknown cases.

12. The prediction apparatus according to claim 10, wherein said input case generating means outputs an aggregate obtained by sampling one or more pieces of case data from the aggregate of the known case data as the aggregate of the case data for inputting unknown cases and outputs the aggregate of the known case data as the aggregate of the case data for inputting known cases, said maximum condition modifying means modifying the maximum condition so as to increase the number of similar cases by one and said similar case deleting means deletes case data overlapping with one piece of case data for inputting unknown cases from an aggregate of similar case data for the one piece of the case data for inputting unknown cases.

13. The prediction apparatus according to claim 3, wherein said similar case extracting means extracts the aggregate of the similar case data similar to the case data for inputting unknown cases using one of memory-based reasoning and case-based reasoning.

14. The prediction apparatus according to claim 3, wherein said condition determining means includes:

condition discretizing means for discretizing and outputting conditions included in the range of the similar case extracting condition;

conditioned similar case extracting means for extracting an aggregate of similar case data for each condition, which satisfying each of discretized conditions, from the aggregate of the similar case data similar to the case data for inputting unknown cases;

prediction result generating means for predicting a value of a field to be predicted in the case data for inputting unknown cases for each condition using the aggregate of the similar case data for each condition, and outputting a prediction value for each condition;

condition evaluating means for obtaining an evaluation value for each condition from the prediction value for each condition; and condition selecting means for selecting the appropriate similar case extracting condition from the discretized conditions based on the evaluation value for each condition.

15. The prediction apparatus according to claim 14, wherein said prediction result generating means generates the prediction result using one of memory-based reasoning and case-based reasoning.

16. The prediction apparatus according to claim 14, wherein when the prediction value is a category value, said condition evaluating means compares the prediction value with a true value of the field to be predicted, and generates the evaluation value based on whether the prediction value matches the true value.

17. The prediction apparatus according to claim 14, wherein when the prediction value is a continuous value, said condition evaluating means compares the prediction value with a true value of the field to be predicted, and generates the prediction value using difference between the prediction value and the true value.

18. The prediction apparatus according to claim 14, wherein said condition evaluating means generates the prediction value taking into consideration a degree of probability accompanying the prediction value.

19. The prediction apparatus according to claim 14, wherein said condition evaluating means obtains a weight from both the prediction value and a true value of the field to be predicted, and generates the evaluation value taking the weight into consideration.

20. The prediction apparatus according to claim 14, wherein said condition evaluating means estimates an execution time of a similar case extraction using at least one of one discretized condition and an aggregate of similar case data satisfying the one discretized condition, and generates the evaluation value taking the estimated execution time into consideration.

21. The prediction apparatus according to claim 14, wherein said condition selecting means selects a condition corresponding to a best value of given evaluation values as the appropriate similar case extracting condition.

22. The prediction apparatus according to claim 14, wherein said condition selecting means calculates a moving average of given evaluation values, and selects a condition corresponding to a best value of obtained average evaluation values as the appropriate similar case extracting condition.

23. The prediction apparatus according to claim 14, wherein said condition selecting means approximates given evaluation values using a function of a condition, and selects a condition corresponding to a best value of obtained approximate evaluation values as the appropriate similar case extracting condition.

24. A prediction apparatus for making a prediction based on similar cases, comprising:

similar case extracting means for extracting one or more pieces of similar case data similar to unknown case data from an aggregate of known case data consisting of one or more fields, based on a degree of similarity;

prediction result generating means for predicting a value of an unknown field of the unknown case data using the one or more pieces of similar case data, and outputting a prediction value; and similarity calculating means for calculating both a distribution of values of the unknown field in the known case data and a weight depending on the value of the unknown field of the unknown case data for each field, and calculating the degree of similarity using the weight for each field.

25. The prediction apparatus according to claim 24, wherein said similarity calculating means divides the aggregate of the known case data according to a value of each field into partial aggregates for each field, and calculates a weight which the smaller it becomes, the closer to a distribution of values of the unknown field as a whole approaches a distribution of values of the unknown field in a partial aggregate to which the unknown case data belong, and which the larger it becomes, the farther from the distribution of the values of the unknown field as a whole moves the distribution of the values of the unknown field of the partial aggregate to which the unknown case data belong.

26. A prediction apparatus for making a prediction based on similar cases, comprising:

similarity calculating means for calculating a similarity condition for adding known case data to a temporary aggregate of previously obtained similar case data using both a similar case extracting condition and the temporary aggregate of the similar case data;

conditioned similarity calculating means for calculating a degree of similarity between the known case data and unknown case data, when the degree of similarity satisfies the similarity condition, for outputting the known case data as similar case data, and when it is confirmed that the degree of similarity does not satisfy the similarity condition, stopping calculation; and generating means for generating a new aggregate of similar case data using the similar case data outputted by said conditioned similarity calculating means.

27. The prediction apparatus according to claim 26, wherein said generating means includes:

similar case aggregate updating means for adding the similar case data outputted from said conditioned similar calculating means to the temporary aggregate of the similar case data, deleting extra case data so as to match the similar case extracting condition, and generating a new aggregate of similar case data; and similar case aggregate storing means for storing the new aggregate of the similar case data as a temporary aggregate of similar case data, and when processes of all the given known case data are terminated, said generating means outputs an aggregate of similar case data stored in said similar case aggregate storing means.

28. A computer-readable storage medium on which is recorded a program for enabling a computer to make a prediction based on similar cases, said program comprising the steps of:

automatically determining a similar case extracting condition for extracting one or more pieces of similar case data similar to unknown case data from an aggregate of known case data consisting of one or more fields;

extracting the one or more pieces of similar case data using the determined similar case extracting condition; and predicting a value of an unknown field of the unknown case data using the one or more pieces of similar case data, and generating a prediction value.

29. A computer-readable storage medium on which is recorded a program for enabling a computer to make a prediction based on similar cases, said program comprising the steps of:

calculating a distribution of values of a field corresponding to an unknown field of unknown case data in an aggregate of known case data consisting of one or more fields;

calculating a weight depending on the distribution for each field;

calculating a degree of similarity using the weight for each field;

extracting one or more pieces of similar case data similar to the unknown case data from the aggregate of the known case data, based on the degree of similarity; and predicting a value of the unknown field of the unknown case data using the one or more pieces of similar case data, and generating a prediction value.

30. A computer-readable storage medium on which is recorded a program for enabling a computer to make a predictions based on similar cases, said program comprising the steps of:

calculating a similarity condition for adding known case data to a temporary aggregate of previously obtained similar case data using both a similar case extracting condition and the temporary aggregate of the similar case data;

calculating a degree of similarity between the known case data and unknown case data;

determining the known case data as similar case data when the degree of similarity satisfies the similarity condition;

stopping calculation when it is confirmed that the degree of similarity does not satisfy the similarity condition; and generating a new aggregate of similar case data using the determined similar case data.

31. A prediction method based on similar cases using a computer, comprising the steps of:

automatically determining a similar case extracting condition for extracting one or more pieces of similar case data similar to unknown case data from an aggregate of known case data consisting of one or more fields;

extracting the one or more pieces of similar case data using the determined similar case extracting condition; and predicting a value of an unknown field of the unknown case data using the one or more pieces of similar case data.

32. A prediction method based on similar cases using a computer, comprising the steps of:

calculating a distribution of values of a field corresponding to an unknown field of unknown case data in an aggregate of known case data consisting of one or more fields;

calculating a weight depending on the distribution for each field;

calculating a degree of similarity using the weight for each field;

extracting one or more pieces of similar case data similar to the unknown case data from the aggregate of the known case data, based on the degree of similarity; and predicting a value of the unknown field of the unknown case data.

33. A prediction method based on similar cases using a computer, comprising the steps of:

calculating a similarity condition for adding known case data to a temporary aggregate of previously obtained similar case data using both a similar case extracting condition and the temporary aggregate of the similar case data;

calculating a degree of similarity between the known case data and unknown case data;

determining the known case data as similar case data when the degree of similarity satisfies the similarity condition;

stopping calculation when it is confirmed that the degree of similarity does not satisfy the similarity condition;

generating a new aggregate of similar case data using the determined similar case data; and predicting a value of an unknown field of the unknown case data using the generated aggregate of the similar case data when processes of all the given known case data are terminated.

* * * * *